US009543080B1

(12) United States Patent
Frank

(10) Patent No.: US 9,543,080 B1
(45) Date of Patent: Jan. 10, 2017

(54) HYDROGEN HYDROTHERMAL REACTION TUBE FOR USE IN NANOPARTICLE PRODUCTION AND NANOPARTICLE APPLICATIONS

(71) Applicant: David Loron Frank, Highland Beach, FL (US)

(72) Inventor: David Loron Frank, Highland Beach, FL (US)

( * ) Notice: Subject to any disclaimer, the term of this patent is extended or adjusted under 35 U.S.C. 154(b) by 0 days.

(21) Appl. No.: 14/954,612

(22) Filed: Nov. 30, 2015

Related U.S. Application Data

(63) Continuation-in-part of application No. 14/202,803, filed on Mar. 10, 2014, now Pat. No. 9,200,816.

(60) Provisional application No. 61/851,809, filed on Mar. 13, 2013, provisional application No. 61/855,140, filed on May 9, 2013, provisional application No. 62/174,004, filed on Jun. 11, 2015.

(51) Int. Cl.
| | |
|---|---|
| *H01G 11/86* | (2013.01) |
| *B01J 19/24* | (2006.01) |
| *H01G 11/48* | (2013.01) |
| *H01G 11/30* | (2013.01) |
| *H01G 11/74* | (2013.01) |
| *H01G 11/08* | (2013.01) |
| *B29C 70/88* | (2006.01) |
| *B29C 70/58* | (2006.01) |
| *B29K 1/00* | (2006.01) |
| *B29K 105/16* | (2006.01) |
| *B29K 509/02* | (2006.01) |
| *B29L 31/34* | (2006.01) |
| *B29L 9/00* | (2006.01) |

(52) U.S. Cl.
CPC ........... *H01G 11/86* (2013.01); *B01J 19/2405* (2013.01); *B29C 70/58* (2013.01); *B29C 70/88* (2013.01); *H01G 11/08* (2013.01); *H01G 11/30* (2013.01); *H01G 11/48* (2013.01); *H01G 11/74* (2013.01); *B01J 2219/00121* (2013.01); *B01J 2219/00164* (2013.01); *B01J 2219/24* (2013.01); *B29K 2001/12* (2013.01); *B29K 2105/162* (2013.01); *B29K 2509/02* (2013.01); *B29K 2995/0005* (2013.01); *B29K 2995/0006* (2013.01); *B29L 2009/00* (2013.01); *B29L 2031/3468* (2013.01)

(58) Field of Classification Search
CPC ......... H01G 11/08; H01G 11/30; H01G 11/48; H01G 11/74; H01G 11/86; B29C 70/58; B29C 70/88; B01J 19/2405
See application file for complete search history.

(56) References Cited

U.S. PATENT DOCUMENTS

| | | | | |
|---|---|---|---|---|
| 3,255,391 A | * | 6/1966 | Yamamoto | H01G 9/0029 361/434 |
| 2004/0206942 A1 | * | 10/2004 | Hsu | B82Y 10/00 252/500 |
| 2007/0151418 A1 | * | 7/2007 | Diaz | B01J 8/20 75/370 |

(Continued)

*Primary Examiner* — Stephen Avila
(74) *Attorney, Agent, or Firm* — Jose Gutman; Fleit Gibbons Gutman Bongini & Bianco P.L.

(57) ABSTRACT

A hydrogen based mixing system for the fabrication of nanoparticles allowing for selection of specified particle size, narrow particle size distribution and core shell nanoparticle encapsulation. A further description of a Dense Energy UltraCapacitor that utilizes the core shell nanoparticles to create an energy storage device.

32 Claims, 10 Drawing Sheets

(56) References Cited

U.S. PATENT DOCUMENTS

| | | | | |
|---|---|---|---|---|
| 2010/0035093 | A1* | 2/2010 | Ruoff | H01G 11/36 |
| | | | | 429/493 |
| 2011/0259244 | A1* | 10/2011 | Herbig | B82Y 30/00 |
| | | | | 106/448 |
| 2011/0281111 | A1* | 11/2011 | Subramanian | B82Y 30/00 |
| | | | | 428/401 |
| 2013/0101999 | A1* | 4/2013 | Chakravarthy | G01N 33/588 |
| | | | | 435/6.11 |
| 2013/0289282 | A1* | 10/2013 | Raston | B01J 19/0093 |
| | | | | 546/350 |
| 2014/0072836 | A1* | 3/2014 | Mills | C25B 1/04 |
| | | | | 429/8 |

\* cited by examiner

Melt points and characteristics of cellulose acetate and Tin based electrodes.

| Tin Properties | | |
|---|---|---|
| Melting point | 231.93 °C | 449.47 |

| Cellulose Acetate Properties | | |
|---|---|---|
| Melting point | 260–270 °C | 500–518 °F |
| | Note: Melt point is reduced with Plasticizer content | |

| Solder Alloy | Melting Point (°C) | Melting Point (°F) |
|---|---|---|
| 5Sn-95Pb | 307 | 585 |
| 0.5Sn-92.5Pb-2.5Ag | 280 | 536 |
| Sn/5Sb | 243 | 469 |
| 100Sn | 232 | 450 |
| 99.3Sn-0.7Cu | 227 | 440 |
| 96.5Sn-3.5Ag | 221 | 430 |
| Sn/3.0Ag/0.5Cu | 219 | 426 |
| Sn/3.8Ag/1.0Cu | 217 | 423 |
| Sn/3.5Ag/1.0Cu/3Bi | 213 | 415 |
| 97In-3Ag | 143 | 289 |
| Sn/57Bi | 139 | 282 |
| 52In-48Sn | 118 | 244 |

HYDROGEN HYDROTHERMAL REACTION TUBE FOR USE IN NANOPARTICLE PRODUCTION AND NANOPARTICLE APPLICATIONS

CROSS-REFERENCE TO RELATED APPLICATIONS

This application is a continuation-in-part of U.S. patent application Ser. No. 14/202,803, which claims priority from both provisional application 61/851,809 filed on Mar. 13, 2013 and provisional application 61/855,140 filed on May 9, 2013. This application also claims priority from provisional application 62/174,004 filed on Jun. 11, 2015. The entire collective teachings of the above-identified applications being herein incorporated by reference.

FIELD OF THE DISCLOSURE

The present disclosure generally relates to fabrication of nanoparticles, and more particularly to a hydrogen-based mixing system for high volume fabrication of nanoparticles that can be applied in a wide variety of applications including a dense energy ultracapacitor.

BACKGROUND

There is a great need for a reliable and efficient means of producing nanoparticles in a narrow particle range along with encapsulation of the nanoparticle to create a core-shell configuration. Multiple means of nanoparticle synthesis are being studied to determine how to enable volume production of high quality nanoparticles in a narrow particle size distribution. None of these processes has been brought to market to-date.

Coated metal and/or ceramic nanoparticles, and core-shell nanoparticles, are of high interest in a broad range of applications and the large scale production of core-shell nanoparticles is not currently efficient nor cost effective.

Other methods of producing metal and/or ceramic nano-powders require high energy costs, have low production rates, and generate significant liquid waste products, and the particles produced need to be suspended in a liquid to ensure that they do not agglomerate leaving surfactants and solvents contaminating the residual product. These methods also produce particles with inconsistent particle sizes.

Volume production of core-shell nanoparticles are required for a wide variety of applications. One application that requires high volume core-shell nanoparticle production is the fabrication of Dense Energy UltraCapacitor devices which comprises a process that applies core-shell nanoparticles in a suspended binder between electrodes to create an energy storage device.

Therefore, there is a recognized need for an efficient high volume production of core-shell nanoparticles.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 10 is a table illustrating various melt points and characteristics of cellulose acetate and Tin based electrodes.

DETAILED DESCRIPTION

Figure 1:
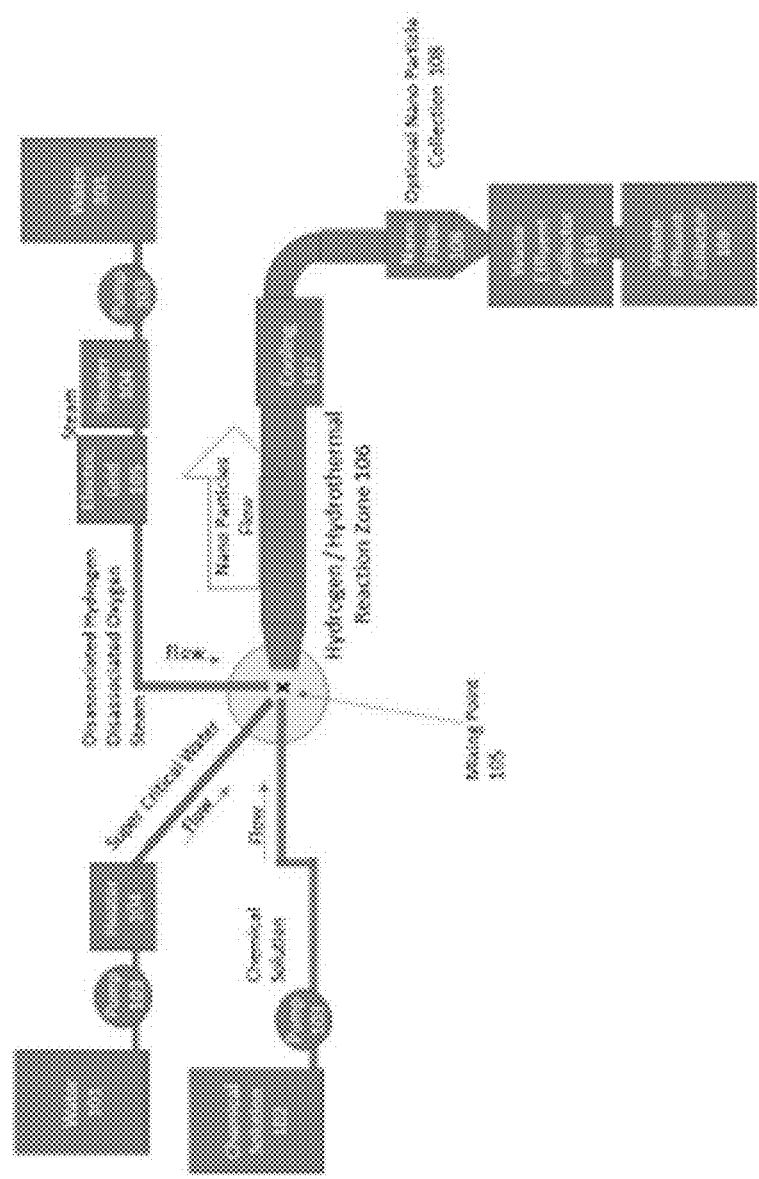
FIG. 1 is a block diagram showing an overview of an example hydrogen/hydrothermal reaction (HHR) nanoparticle synthesis system, according to various embodiments of the present disclosure.

As required, detailed embodiments will be disclosed herein; however, it is to be understood that the disclosed embodiments are merely examples and that the devices, structures and methods described herein can be embodied in various forms. Therefore, specific structural and functional details disclosed herein are not limiting, but merely as a basis for the claims and as a representative basis for teaching one of ordinary skill in the art to variously employ the disclosed subject matter in virtually any appropriately detailed structure and function. Further, it is intended that the terms and phrases used herein be non-limiting, and provide an understandable description. Additionally, unless otherwise specifically expressed herein or clearly understood from the context of use, a term as used herein describes the singular and/or the plural of that term.

Various embodiments of the present disclosure apply the basic principles of the hydro jet to create a nanoparticle synthesis method. The hydro jet described in U.S. patent application Ser. No. 14/202,803, uses the recombination of atomic hydrogen and oxygen to create heat and pressure. The inventor has applied the atomic hydrogen and oxygen with supercritical fluid and controlled heat and pressure to a reaction tube that enables a micro mixer for nanoparticle generation with precision. In the hydrogen/hydrothermal reaction (HHR), the disassociated hydrogen and oxygen still in heated form come in contact with a chemical solution at a mixing point. Supercritical fluid, such as water under heat and pressure, can be combined to further enable the formation of nanoparticles from the chemical solution.

The hydrogen/hydrothermal reaction (HHR) provides controlled high temperature and pressure conditions in the HHR Tube enabling extremely rapid reaction rates and high conversion rates for the selected chemical solutions creating nanoparticles based on the chemical solution.

Supercritical water occurs when the water is at a temperature and pressure above its critical point, where distinct liquid and gas phases do not exist. It can effuse through solids like a gas, and dissolve materials like a liquid. Supercritical fluids are suitable as a substitute for organic solvents in a range of industrial and laboratory processes.

In another embodiment, the heat and pressure can be applied to coat nanoparticles in a HHR Tube. In the hydrogen/hydrothermal reaction (HHR), the disassociated hydrogen and oxygen still in heated form come in contact with the nanoparticles and a coating solution in the HHR Tube at a mixing point. Supercritical water can be combined therewith to further enable the formation of nanoparticles from the chemical solution.

The nanoparticles are placed in the chemical coating solution.

Nanoparticles of specific diameters with narrow particle size distributions can be created by controlling the heat, pressure and chemical solution flow rate.

Continuous HHR syntheses of nanoparticles are possible with an ability to adjust to a specific particle size and narrow particle size distribution. Typical reaction conditions are 300° C. to 1,500° C., 20 MPa-4200 MPa, with residency times of less than 3 seconds.

The HHR reaction takes place in the HHR Tube where the chemical solution enters the mixing point and is exposed to high heat and pressure from the interaction with supercritical water, disassociated hydrogen and disassociated oxygen. The chemical solution is a mixture designed to produce a composite material. The rapid heat and pressure reaction causes the chemical solution to form nanoparticles. The control of the amount of chemical solution, heat and pressure determines the size of the particles generated.

Ordinary hydrogen gas consists of di-atomic molecules in which two H-atoms unite together by covalent bond. This is known as molecular hydrogen. H—H bond energy is very high, i.e., 104 Kcal per mole. Due to high bond energy molecule of hydrogen is very stable. It does not react under ordinary conditions.

Disassociated molecular hydrogen is called atomic hydrogen. Atomic hydrogen is very energetic, very reactive and has a very short life spontaneously combining to form molecular hydrogen. Disassociated hydrogen can be created with the application of high heat.

The recombination of the atomic hydrogen and oxygen to form water releases energy within the HHR disassociated oxygen and hydrogen still in heated form come in contact with the chemical solution at the mixing point in the HHR Tube.

The HHR Tube inputs can have rifling grooves or ridges across the inside surface of the tube to increase power and efficiency of the mixing point.

Dielectric Nanoparticle Production

Nano-particles of a high dielectric material such as calcium copper titanate, $CaCu_3Ti_4O_{12}$ and $La_{15/8}Sr_{1/8}NiO_4$ LSNO can be synthesized using the HHR Tube. Calcium copper titanate CCTO and LSNO have extremely large effective dielectric constants of approximately 12,000 at room temperature and up to 160,000 under certain configurations. The HHR Tube can also be used to apply a coating to the dielectric particles creating a core and shell design where the dielectric particle would be applied as the core and material compatible with the core is applied as the outer shell. The sell material could be an insulating material such as $Al_2O_3$.

Standard CCTO or CCTO synthesized with a specific copper content and/or metallic doping can be synthesized using the HHR Tube.

Example Nanoparticle Application

A hybrid ultracapacitor and dense energy power storage device and methods of production are described. These methods use nano and/or micro (core-shell) particle energy storage media (energy storage layers) with high performance suspension media and electrodes, both anodes and cathodes, to enable rapid charge and dense energy storage in a scalable cell with efficient fabrication methods to support a wide variety of applications.

The core-shell dielectric nanoparticles may be suspended in a matrix to fabricate tens to hundreds to thousands of energy storage layers. The energy storage layers are interleaved in between electrode layers to form a unified multilayer device. The energy storage layers and electrode layers are less than 50 microns. The unified multilayer device is called the Dense Energy Ultracapacitor (DEUC). In one embodiment, a suspended particle Dense Energy Ultracapacitor (DEUC) is fabricated by suspending high permittivity dielectric particles, of a core-shell configuration, in a matrix to create an energy storage layer. The energy storage layer is interleaved in between electrode layers to form a Dense Energy Ultracapacitor device.

The dielectric particles are configured in a core-shell design where the core is a perovskite material with high dielectric characteristics such as calcium copper titanate oxide (CCTO) with an electrically insulating shell material such as aluminum oxide ($Al_2O_3$).

The permittivity of the energy storage matrix is a key factor in creating a high energy density storage device such as the DEUC. The inventor has been able to synthesize high permittivity dielectric particles. The inventor has modified the high dielectric materials increasing the permittivity values and have applied an insulating shell to the dielectric particle forming a core-shell particle. The core-shell particle design locks in the dielectric charge and eliminates interfacial contact between the high dielectric core of the particle and the material that the core shell particle is suspended.

When calculating the effective dielectric permittivity of a matrix, standard Effective Medium Theories (EMT) such as Maxwell-Garnett and Bruggeman models do not provide accurate permittivity predictions for the matrix. These models are based on highly ordered particles in the matrix and in a two dimensional plane.

High permittivity values within the energy storage matrix have been obtained by applying a three layer permittivity analysis where the three layers are also applied in a three dimensional structure. The three layers are made up of 1) the core of the dielectric particle, 2) the electrically insulating shell of the dielectric particle, and 3) the matrix that the core-shell dielectric particle is suspended in.

The ability to insulate the core dielectric particle from the suspension material, by applying an insulting shell to the core particle eliminates all interfacial contact between the core dielectric and the suspension matrix. The intermediate material (the particle shell), creates at least two separate dielectric values in the matrix. One dielectric value is the core dielectric material and the second dielectric value is the suspension material. The effective permittivity of the three layer matrix is significantly greater than the effective permittivity of a two layer configuration where both layers have direct interfacial contact. In addition, the effective permittivity is raised when the quantity of filler (core-shell particles) are loaded at the percolation threshold within the matrix.

Percolation theory states that when the loading of fillers in a matrix reaches a critical value, substantial changes take place in the electrical properties of the matrix. Sometimes these changes are in the order of more than a hundred times. This critical loading factor of the filler within the matrix is called the percolation threshold. The percolation threshold for CCTO core-shell particles in a polymer matrix is between a 15% and 50% fill factor of the particles when compared to the volume of the volume.

The electrodes may be comprised of metal or conducting polymer. One or more layers of the DEUC thin film comprise negative and positive electrodes made from metal, metal alloy, conducting polymer, and or a matrix of conducting particles suspended in either metal or polymer that are spaced apart by energy layers.

The energy and electrode layers may be fabricated in a variety of methods including spray deposition.

In another embodiment, a suspended particle Dense Energy Ultracapacitor DEUC Preform for fabricating a DEUC module that provides rapid charge and energy storage, comprises: a multilayer DEUC Preform made up of multiple layers of polymer matrix, and or metal layers having a size, a shape, and an arrangement of a plurality of layers with similar melt points and flow characteristics when heated that is suitable for drawing (stretching) by a draw process and/or stretching into a multilayer thin film having DEUC structural features in at least one dimension proportionally reduced in comparison to the same DEUC structural features in the Preform; and where one or more layers of the Preform comprise negative and positive electrodes made from metal, metal alloy, conducting polymer, and or a matrix of conducting particles suspended in either metal or polymer that are spaced apart by suspended particle high dielectric energy storage media; where one or more layers of the Preform comprise suspended particle high dielectric energy storage media; where the high dielectric energy storage media comprises high dielectric particles that are at least one of nano and/or micro sized particles suspended in a binder comprising at least one of a polymer, a copolymer, and or a terpolymer, and where all of the Preform layers are bound together to form a unified Preform.

In another embodiment, a suspended particle Dense Energy Ultracapacitor DEUC thin film for fabricating a DEUC module provides rapid charge and energy storage is created from a draw process (stretching) of the DEUC Preform and comprises: a multilayer film comprising a plurality of layers having similar melt points and flow characteristics when heated (matched), have DEUC structural features resulting from drawing, by a draw process, of a multilayer DEUC Preform having a size, a shape, and an arrangement of a plurality of matched layers, the multilayer thin film having DEUC structural features in at least one dimension proportionally reduced in comparison to the same DEUC structural features in the Preform; and where one or more layers of the multilayer thin film comprise negative and positive electrodes made from one or more of the following; conducting polymer, a conducting polymer matrix, metal, metal alloy and or a matrix of conducting metal particles that are spaced apart by suspended particle high dielectric energy storage media; where one or more layers of the multilayer thin film comprise suspended particle high dielectric energy storage media; where the high dielectric energy storage media comprises high dielectric particles that are at least one of nano and/or micro sized particles suspended in a binder comprising at least one of a polymer, a copolymer, and a terpolymer, and where all of the multilayer polymer thin film layers are bound and unified together.

In a third embodiment, the DEUC further comprises one or more layers of the multilayer thin film spaced apart to form a cooling tunnel, and where heat within the suspended particle DEUC module is transferred into the cooling tunnel and moved to and released through a thermal coupler.

In an fourth embodiment, at least one suspended particle DEUC modules is coupled with at least one of: one or more solar cells, one or more radioisotope power cells, a photovoltaic system, a thermalvoltaic system, a movement charge system, and a manual charge system, for providing electric charge to the DEUC module and electric energy storage by the DEUC module.

In a fifth embodiment, a suspended particle Dense Energy Ultracapacitor DEUC thin film for fabricating a DEUC module that provides rapid charge and energy storage, comprises: multiple layers of polymer matrix thin films and metal electrode thin films comprising a plurality of layers having similar melt points forming the DEUC structural features resulting from drawing, by a draw process, of a multilayer DEUC Preform having a size, a shape, and an arrangement of a plurality of the multiple layers, the multilayer thin films having DEUC structural features in at least one dimension proportionally reduced in comparison to the same DEUC structural features in the Preform; and where one or more layers of the multilayer thin films comprise negative and positive electrodes made from a soft metal such as tin (Sn) and that are spaced apart by suspended particle high dielectric energy storage media; where one or more layers of the multilayer thin films comprise suspended particle high dielectric energy storage media; where the high dielectric energy storage media comprises high dielectric particles that are at least one of nano and/or micro sized particles suspended in a binder comprising at least one of a polymer, a copolymer, and a terpolymer, and where all of the multilayer polymer thin film layers are bound and unified together.

In a sixth embodiment the DEUC design includes a metallic or other dense material applied at or within one or more electrode layers to cause an interact with radiation including naturally occurring background radiation for the creation of an electric charge. For example, naturally occurring gamma radiation would impact the dense material and cause a large number of electrons to be dispersed into the electrode resulting in a charge. The large or small charge creates an electric field across the electrodes that surround the dielectric particle and increase the charge within the dielectric particle. This could be used as a natural trickle charge for the DEUC.

In various alternative embodiments, at least one suspended particle DEUC module is designed and fabricated to power at least one of: micro devices, integrated circuits, electric vehicles, unmanned aerial vehicles, electronic cigarettes, mobile computing devices, laptops, tablets, mobile phones, wireless communication devices, mobile sensor systems.

In further various alternative embodiments, at least one suspended particle DEUC module is designed and fabricated for at least one of: electric power grid support and to provide uninterruptible power supplies.

In FIG. 1 is shown an overview of the HHR Nanoparticle Synthesis System. Water 101 is supplied through a pump 103 and enters a heater 104 where super critical water is created and driven into the mixing point 105. A chemical solution 102 is pumped 103 into the mixing point. The disassociated hydrogen and or oxygen flow into the mixing point 105.

The heat and pressure applied by the supercritical water, disassociated hydrogen, and disassociated oxygen cause a reaction at the mixing point 105 with the chemical solution 102 that generates nanoparticles in the hydrogen/hydrothermal reaction zone 106. The nanoparticles and fluids are cooled in the Colling chamber 107 and pass through a nano filter 106 to collect the nanoparticles 110. The remaining effluent is captures in the waste effluent collector 109.

Figure 2:
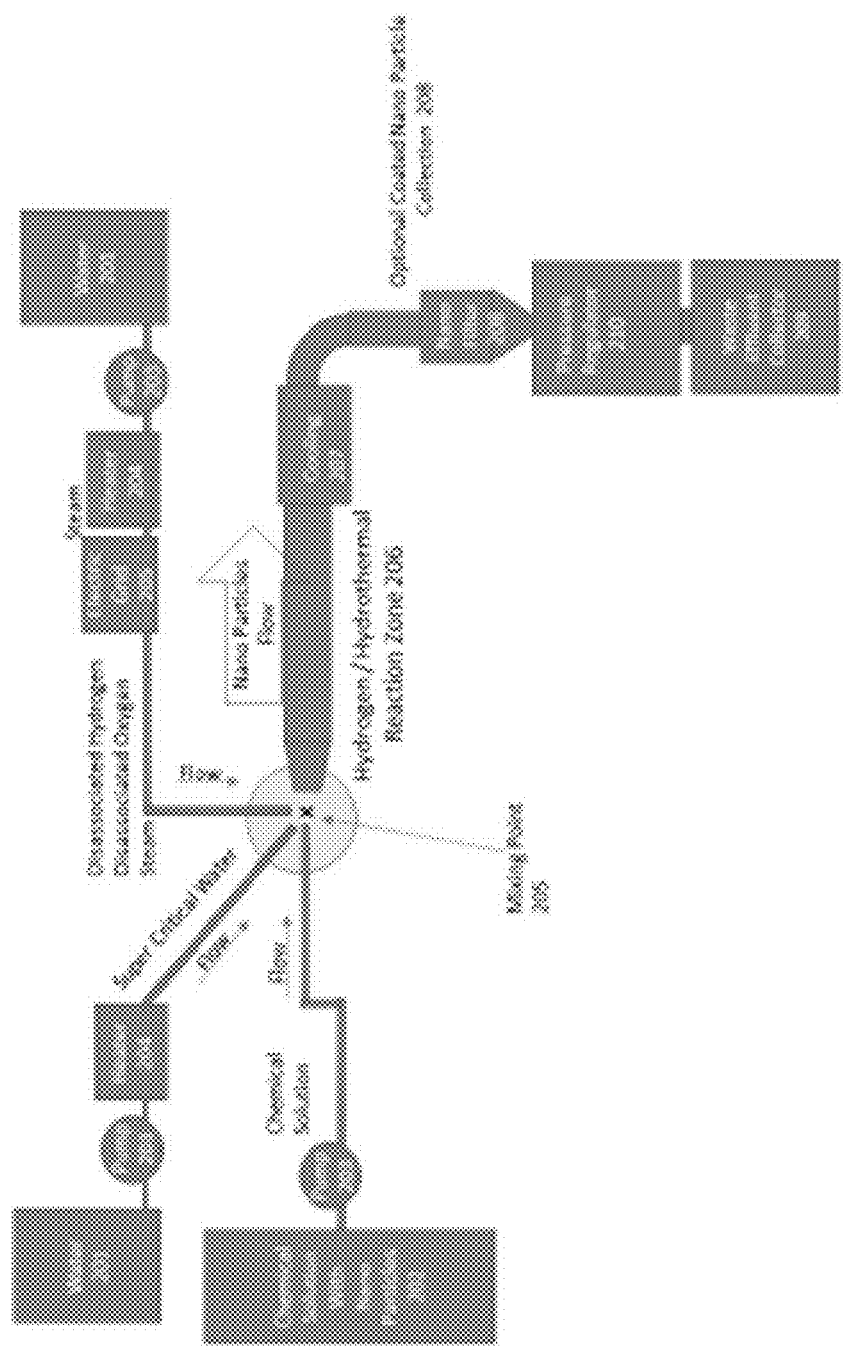
FIG. 2 is a block diagram showing an overview of an example hydrogen/hydrothermal reaction (HHR) nanoparticle coating system, according to various embodiments of the present disclosure.

In FIG. 2 is shown an overview of an example HHR Nanoparticle Synthesis System. Water 201 is supplied through a pump 203 and enters a heater 104 where super critical water is created and driven into the mixing point 205. A chemical solution containing nanoparticles and a coating mixture 202 is pumped 203 into the mixing point. As an option, water 201 is pumped 203 into a heater 204 to create disassociated hydrogen and oxygen. The disassociated hydrogen and oxygen flow into the mixing point 205.

The heat and pressure applied by the supercritical water, disassociated hydrogen, and disassociated oxygen cause a reaction at the mixing point 205 with the chemical solution of nanoparticles and coating mixture 202 that applies a coating on the nanoparticles in the hydrogen/hydrothermal reaction zone 206.

The nanoparticles and fluids are cooled in the Colling chamber 207 and pass through a nano filter 206 to collect the coated nanoparticles 210. The remaining effluent is captures in the waste effluent collector 209.

Figure 3:
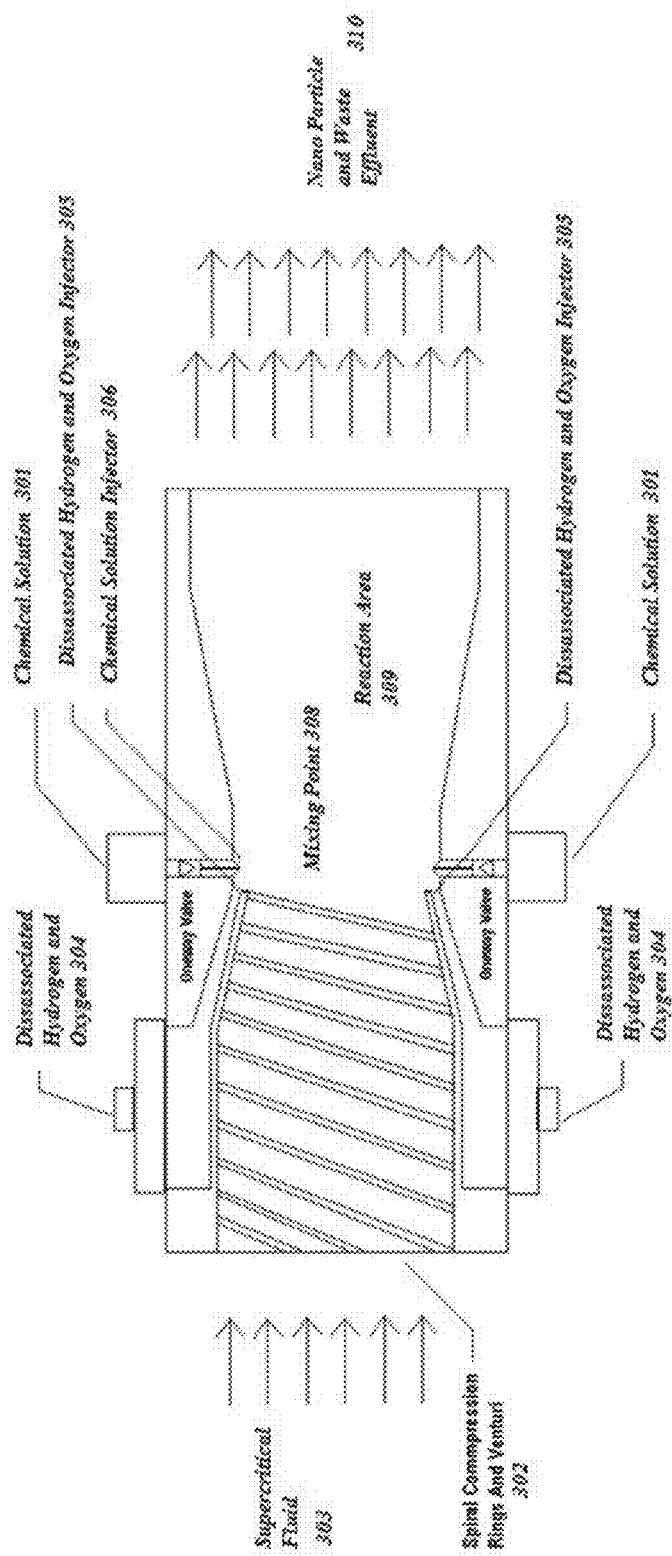
FIG. 3 is a cross-sectional side view of an example hydrogen/hydrothermal reaction (HHR) tube, according to various embodiments of the present disclosure.

In FIG. 3 is illustrated an example of the HHR Tube where super critical fluid (such as water) 303 and atomic hydrogen and or atomic oxygen 304 is applied to the mixing point of the HHR tube 308. The chemical solution enters the HHR Tube 301 and is exposed to the super critical fluid 303, atomic hydrogen 304 and or atomic oxygen 304 in the mixing area 308 where the chemical solution generates nanoparticles 310 under the applied heat and pressure into the reaction area 309. The heat and pressure and chemical reaction occurs with the combination of the chemical solution intake, high pressure super critical water and the recombination reaction of the atomic hydrogen and atomic oxygen. A port is defined as an opening that allows for the input or extraction of a fluid, gas, chemical, solution or any other material used in the HHR tube. The chemical port 301 may be directed at different angles into the supercritical fluid, at angles to the supercritical fluid 303 or in line with the super critical fluid 303.

The supercritical water flow (303) and the chemical solution (301) flow positions may be exchanged in the HHR Tube.

The hydrogen and oxygen recombination creates an exothermal heat reaction in the mixing and reaction areas and thrust driving the nanoparticles and waste effluent out of the end of the HHR Tube.

Supercritical Fluids

Carbon dioxide is available either in commercial cylinders or spheres of limited volumes, or in bulk from tanks of liquefied gas at a pressure of 18 bar and at a temperature around −18° C.

Carbon dioxide always behaves as a "non-polar" solvent that selectively dissolves water-insoluble compounds. Carbon dioxide does not dissolve the hydrophilic compounds like sugars and proteins, and mineral species like salts and metals. Co-solvents, such as an organic solvent, may be added to the main supercritical fluid to modify its solvent power.

Figure 4:
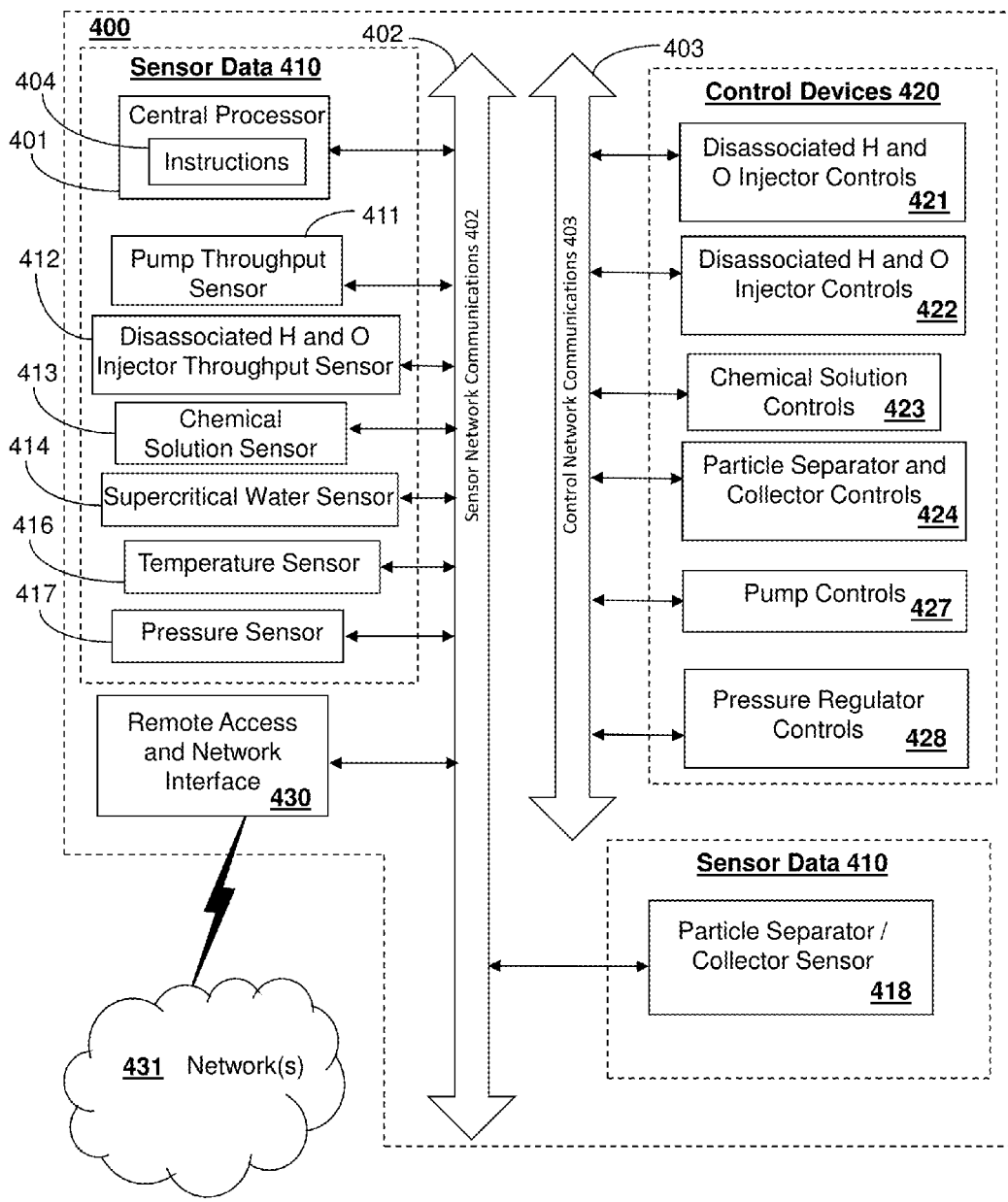
FIG. 4 is a block diagram illustrating an example of an information processing system suitable for use in the example hydrogen/hydrothermal reaction (HHR) nanoparticle synthesis system of FIG. 1 and the example HHR nanoparticle coating system of FIG. 2, according to various embodiments of the present disclosure.

With reference to FIG. 4, the example information processing system 400 comprises at least one processor 401 that is communicatively coupled via a data and/or signaling network 402 to system sensors 410 and is communicatively coupled via a data and/or signaling network 403 to system control devices. In various embodiments the two networks 402, 403, shown in this example may be implemented in one or more data and/or signaling networks. The central processor 401 performs operations in response to executing instructions 404, such as from software programs. The instructions 404 can include program code, e.g., source code and/or executable code, configuration parameters, and data for use with the program. The central processor 401, in the present example, is communicatively coupled with a graphical user interface (GUI) (not shown) to receive user input from, and to provide user output to, users and technical personnel associated with operating the information processing system 400. The central processor 401, in response to executing the instructions, can read data from the sensors 410 and maintain set parameters and controls for all of the individual devices 420 within the HHR Tube system.

The central processor reads information from the sensors 410 and controls the control devices 420 to maintain the desired parameters for the formation of nanoparticles and coatings based on the programmed parameters applied in the central processor 401.

The pump throughput sensors 411 provide the central processor 401 with metered flow information.

The Disassociated H and O injector throughput sensors 412 provide the central processor 401 with metered flow and pressure at the spray head. The Chemical Solution sensors 413 provide the central processor 401 with information on levels, pressure and metered flow of the chemical solution. The super critical water throughput sensors 414 provide the central processor 401 with through put and volume of supercritical water applied. The temperature 416 and pressure 417 sensors provide the central processor 401 with the environment within the mixing area and reaction area.

The Disassociated H and O injector controls 421 and Supercritical fluid (such as Water) controls 422 provide the central processor 401 with the ability to turn on, turn off, vary, adjust or maintain or adjust the temperature and pressure in the mixing and reaction areas.

The particle separator and collector controls 424 provide the central processor 401 with the ability to turn on, turn off, vary, adjust, or maintain the particle separator and collector. The particle separator and collector sensors 418 provide signaling to the central processor 401 to monitor the operating conditions of the particle separator and collector.

The chemical solution controls 423 provide the central processor 401 with the ability to turn on, turn off, vary, adjust, or maintain the chemical solution applied to the mixing area.

The pump controls 427 provide the central processor 401 with the ability to turn on, turn off, vary, adjust, or maintain, the pumps.

The pressure regulator controls 428 provide the central processor 401 with the ability to maintain the desired pressure.

The user interface on the central processor 401 allows service or supervisory personnel to operate the local system 401 and to monitor the status of the HHR Tube system.

The central processor 401 system can also be communicatively coupled with a remote access system 430 such as via a network 431. The remote system 430 comprises an information processing system that has a computer, memory, storage, and a user interface such as a display on a monitor and a keyboard, or other user input/output device.

The network 431 comprises any number of local area networks and/or wide area networks. It can include wired and/or wireless communication networks. This network communication technology is well known in the art.

Figure 5:
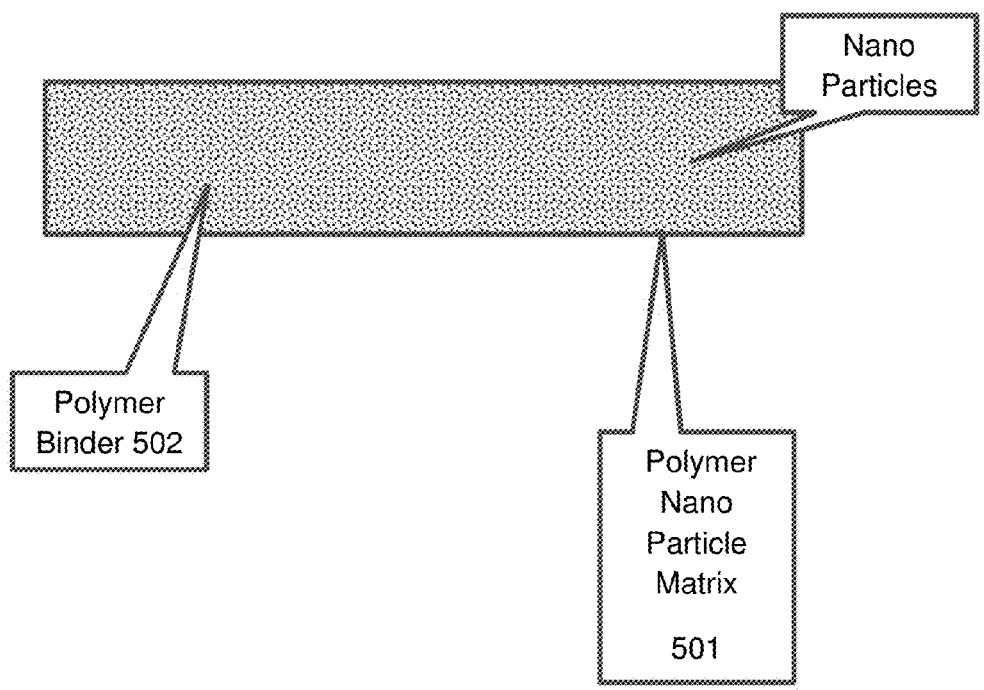
FIG. 5 is a block diagram illustrating an example of nanoparticles suspended in a polymer matrix.

In FIG. 5 is illustrated nanoparticles 503 suspended in a polymer binder 502 to form a polymer/nanoparticle matrix 501. The polymer nanoparticle matrix could be a dielectric particle such as calcium copper titanate oxide suspended in a polymer such as cellulose acetate to form an energy storage layer.

Figure 6:
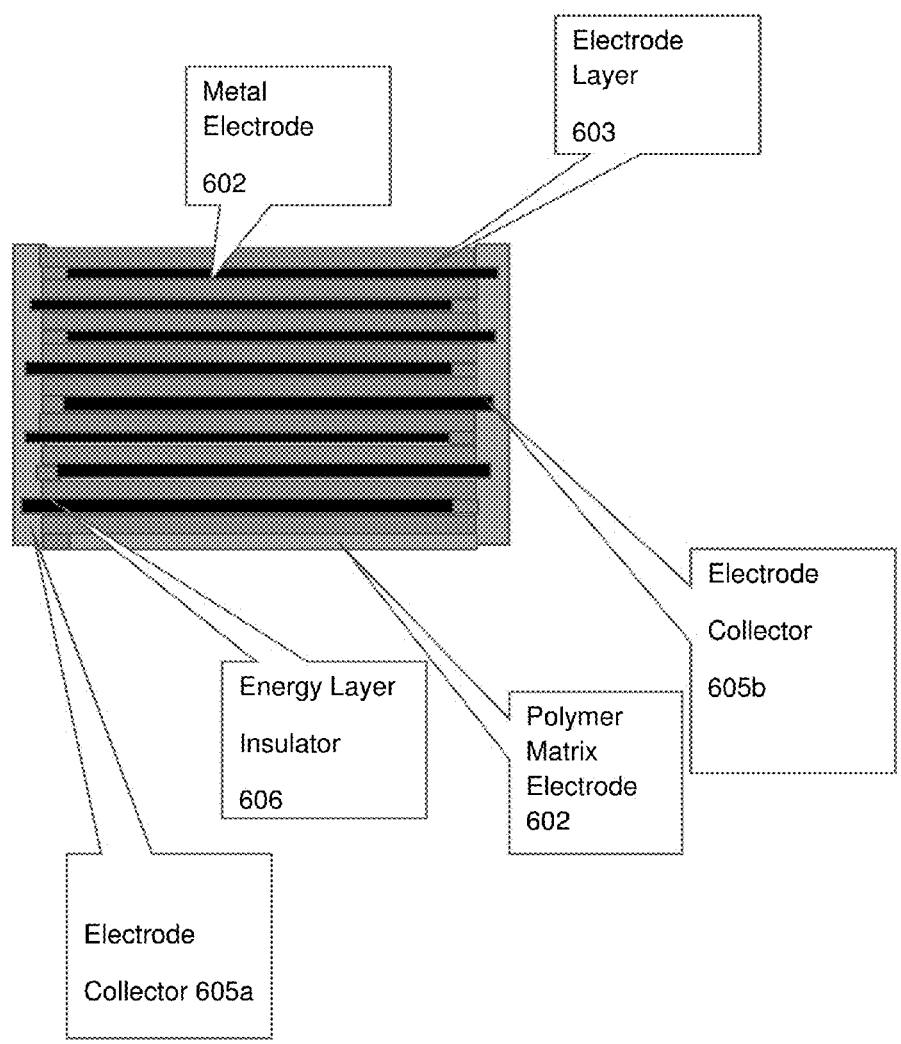
FIG. 6 is a cross-sectional side view of an example DEUC preform, according to the present disclosure.

FIG. 6 shows an exploded view of a cross section of the DEUC preform 601 where both metal and polymer layers are integrated. Energy layers 606 are interleaved in between metal electrode layers 603.

The electrodes are offset, alternating left to right in the stack with an electrode collector 605a interconnecting the electrodes on the left and another electrode collector 605b interconnecting the electrodes on the right.

Energy layer 606 is also an insulator layer that separates the right and left electrodes.

Polymer matrix electrodes 602 may be applied on the top and/or bottom of the stack and as electrode collectors to encapsulate the Preform in polymer.

Figure 7:
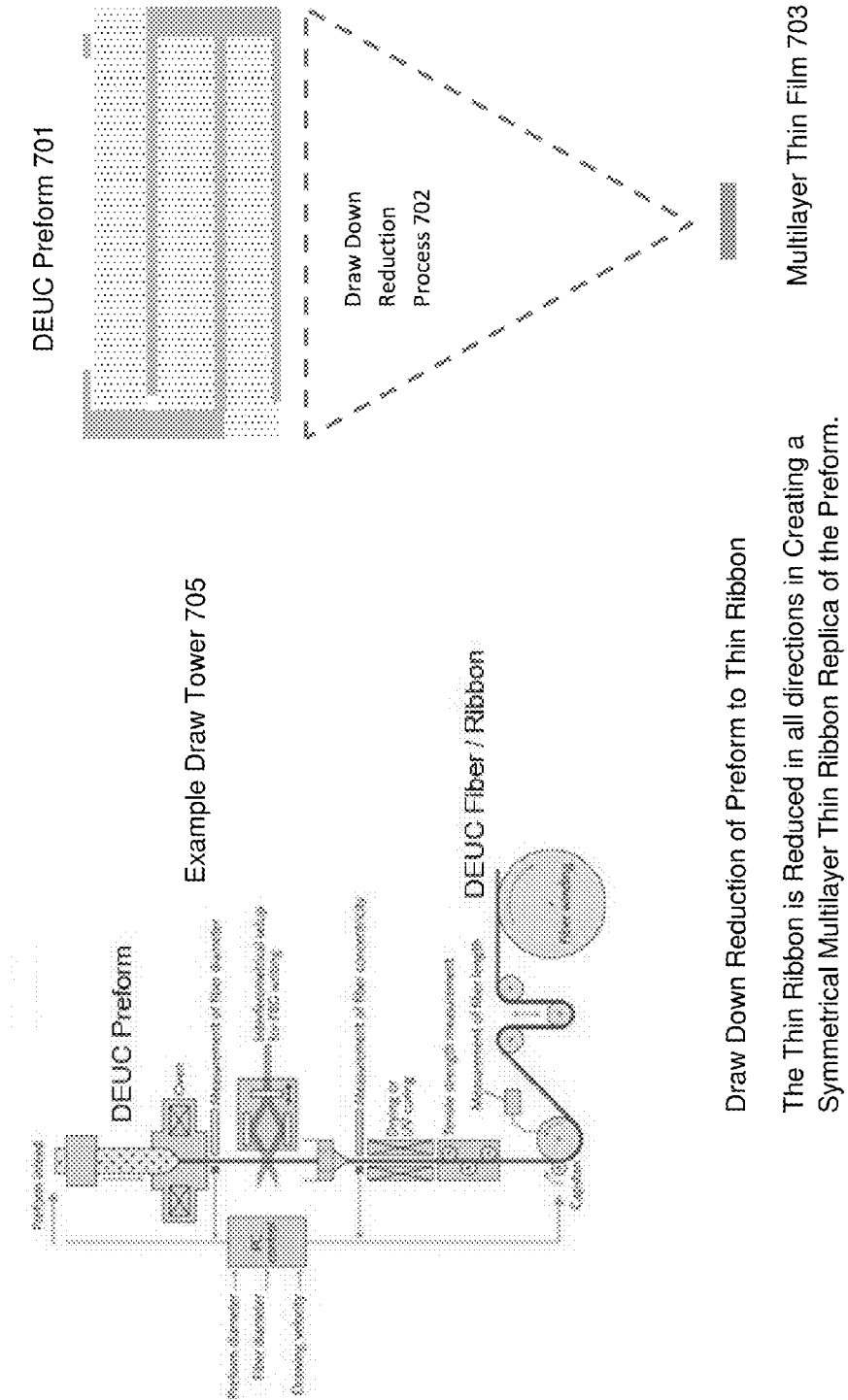
FIG. 7 is a block diagram illustrating a draw process for DEUC preform reduction to ribbon, according to various embodiments of the present disclosure.

FIG. 7 illustrates the DEUC preform 701 placed in a draw tower 705 for drawing (stretching) 702 of the preform into a thin ribbon multilayer thin film 703.

Figure 8:
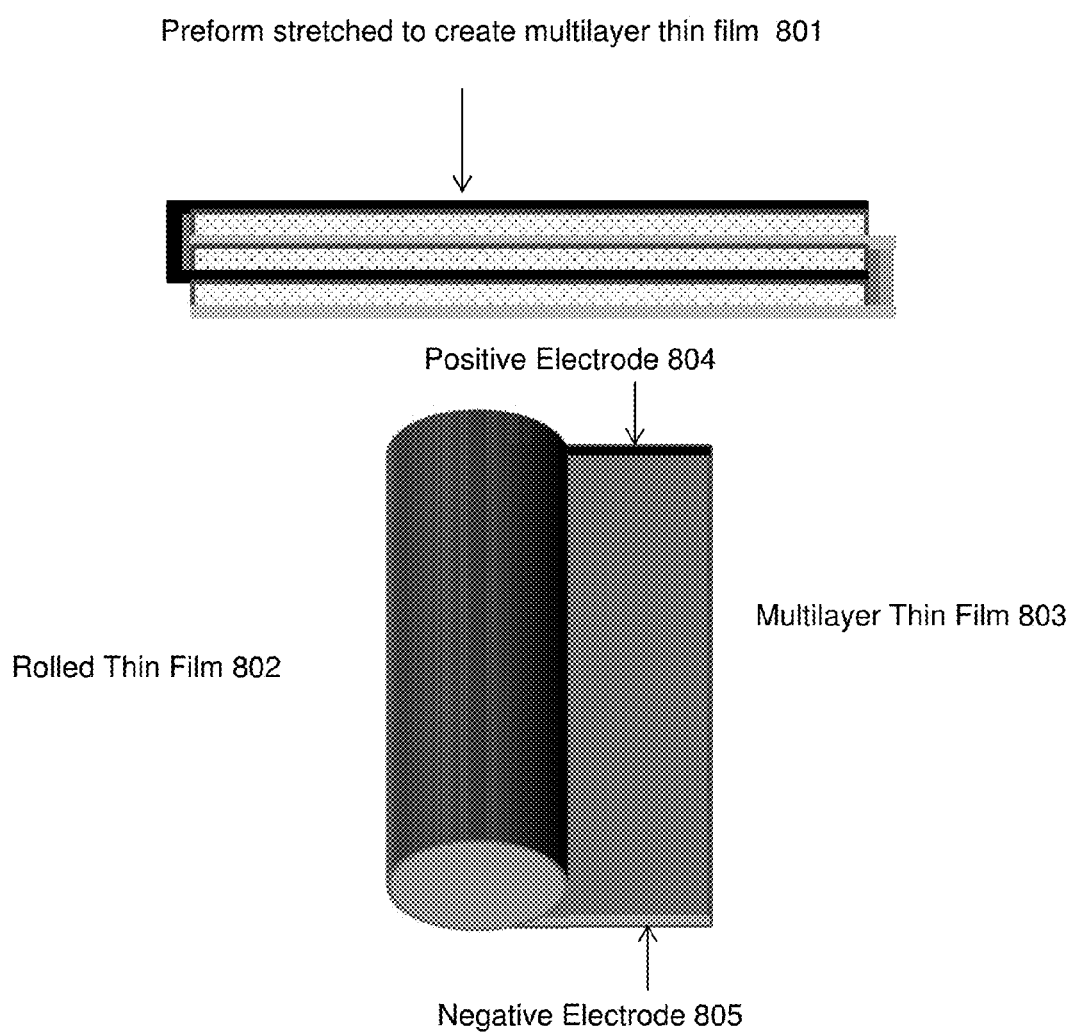
FIG. 8 is an example of a DEUC thin film which can be rolled to fabricate a DEUC energy storage module, according to the present disclosure.

In FIG. 8, an example of a DEUC thin film 108 is rolled into a cylinder to form an energy storage cell.

DEUC Application of Core Shell Nanoparticles

The DEUC application of the core shell nanoparticles fabricated using the HHR Tube provides, according to one embodiment, a hybrid ultracapacitor/deep cell battery technology and applies a high dielectric material in the form of nano and/or micro particles that are suspended in a polymer binder and positioned in between anode and cathode conductor elements. The inventor has named this new technology as Dense Energy UltraCapacitor (DEUC) technology, as will be further discussed below. The DEUC is fabricated using a multilayer preform that is stretched and/or pulled in a uniaxial or biaxial direction, creating a multilayer thin film.

The preform is essentially a larger DEUC module that is drawn, stretched, and/or pulled to change the structure of the Cellulose Acetate polymer used to suspend the dielectric particles and to cause all of the layers of the preform to become extremely thin. The resulting DEUC multilayer thin film can be rolled into a cylindrical shape or folded into various shapes and multi-sided topologies.

The multilayer preform can be stretched, for example, to create a reduced dimension thin film which solves the issue of scalability. The DEUC enables the fabrication of large area modules using a preform fabricated at a larger scale that can be drawn and/or stretched into thin films of a smaller scale.

The use of micro fabrication techniques to create and combine components at the nano scale is typically impractical. Spray deposition to create the nano level components requires extensive curing cycles for each layer and is a complex process.

The DEUC design solves the issue of efficient and cost effective fabrication of an ultracapacitor that provides high energy density, rapid charge times, and unlimited charge cycles.

The Preform layers must have similar melt point and heated flow characteristics to achieve a homogeneous flow of all of the layers in the Preform during the draw (stretch) process. The drawing device, such as a draw tower, heats the Preform and draws (stretches) the unified Preform in a homogeneous flow to achieve the DEUC thin film.

Figure 9:
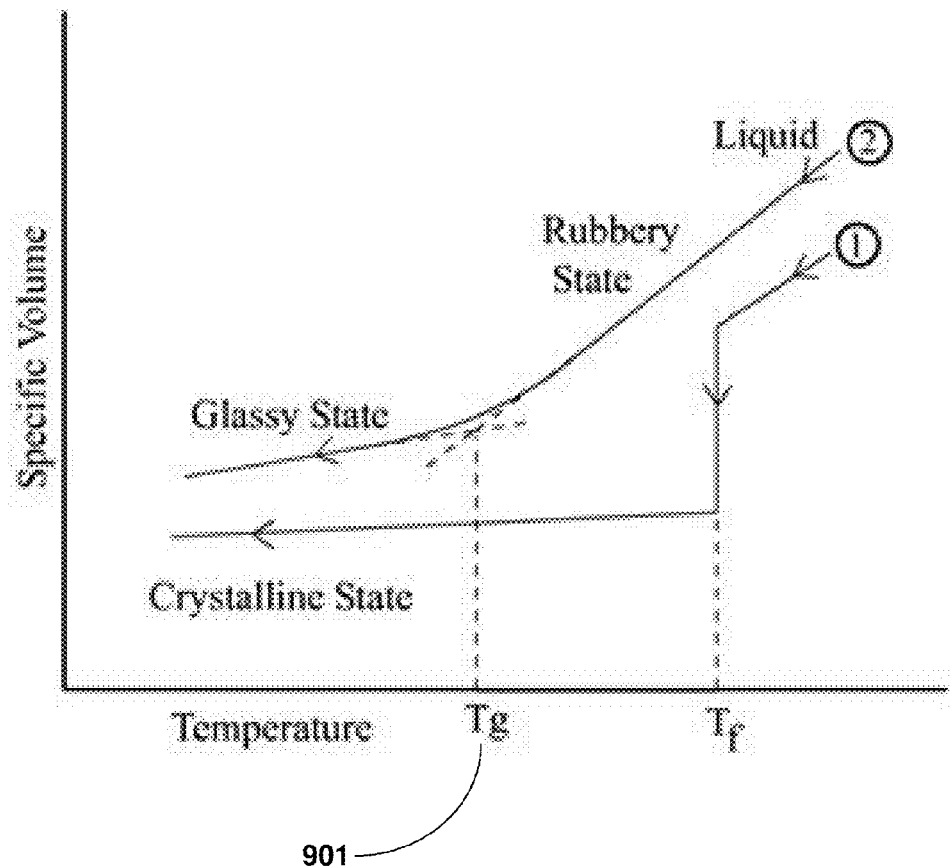
FIG. 9 is a graph diagram illustrating melt and flow characteristics of a polymer.

In evaluating a polymer or other material for a Preform binder, it is important to understand the concept of the glass transition temperature. In FIG. 9, $T_g$. (901) represents the temperature where the polymer behaves in an increasingly brittle manner. As the temperature rises above $T_g$ (901) the polymer becomes more rubber-like. Thus, knowledge of $T_g$ is essential in the selection of materials for various applications. In general, values of $T_g$ well below room temperature define the domain of elastomers and values above room temperature define rigid, structural polymers.

The DEUC energy storage media can be based, for example, on nano-particles fabricated using the HHR Tube system with high dielectric material such as calcium copper titanate, $CaCu_3Ti_4Oi2$ and $La15/8Sr1/8NiO4$ LSNO. Calcium copper titanate CCTO and LSNO have extremely large effective dielectric constants of approximately 12,000 at room temperature and up to 160,000 under certain configurations. The particles may have a protective and electrically insulating coating applied in a core-shell particle configuration before being suspended in a binder. The core and shell dielectric particle is applied has the dielectric particle as the core and an insulating material compatible with the core and binder material is applied as the outer shell. The insulating shell insulating shell is applied to and surrounding each of the particles preventing interfacial contact between the particles and between the particle and polymer binder that suspends the particle. The polymer binder may be an individual polymer, a copolymer, or a terpolymer. The preferred polymer binder is cellulose acetate.

By insulating and eliminating the interfacial contact between the dielectric particles and the polymer binder, the high dielectric value of the dielectric particle is maintained within the polymer particle matrix.

Should the dielectric particle be suspended in a matrix without insulation, the dielectric characteristics of the dielectric particle and the binder for the matrix are combined. Having interfacial contact between the particles and the binder creates a lower dielectric value for the particle. In fact, with direct contact between the two dielectric materials, the resulting dielectric values are less than combined weighted average of the ratio of the two materials. The dielectric particle must be electrically insulated from the binder to retain its high dielectric value.

Cellulose Acetate (Ca) or related polymers are offered as a suspension polymer for the dielectric micro and/or nano-particles.

Standard CCTO or CCTO synthesized with a specific copper content and/or metallic doping can be suspended in a media with high electric breakdown characteristics to create a high density energy storage media.

The storage medial can be fabricated as a thin film with high performance electrodes to create a high density ultracapacitor to be applied in a wide range of applications.

DEUC cells can be combined in a two or three dimensional configuration to further increase energy storage capacity. The three dimensional DEUC layers interconnect the multiple three dimensional DEUC layers to increase DEUC capacity.

To further increase performance, one or more of the anodes or cathodes can be designed as a lattice with dielectric particles interleaved in the electrode or cathode lattice to create increased surface interconnection between the anode and/or cathode with the energy storage media.

Temperature and/or electric voltage can affect the energy storage media causing contraction and/or swelling of the media. The storage media and the electrodes need to be compatible to ensure that the interconnection remains optimum between the two components.

The electrodes need to be flexible and move with the effects of the flexing of the storage media. Matching the characteristics of the polymer based energy storage layer with the electrode layer is one means of maintaining a cohesive design. The electrode may comprise a metallic material, electrical conducting polymers, and a suspension matrix with conducting particles or a combination thereof. The preferred electrodes are made using an electrical conducting metal such as tin (Sn) or a metal alloy that matches the melt and flow temperatures of the selected polymer to be used in the Preform. This allows all of the layers to flow together in a consistent fashion during the draw (stretching) process and provides the flexibility to maintain a cohesive connection between the energy storage layer and the electrodes.

Calcium Copper Titanate Oxide

Pure CCTO bulk properties are optimized by reducing impurities and anomalies to improved performance in the Dense Energy Ultracapacitor. The inventor has created proprietary CCTO utilizing variations in copper content and/or doping with a metallic material called CCTO-X, as will be discussed in more detail below.

The CCTO dielectric oxide material is derived from compounds found in group IIA, IB, and IV of the periodic table, with dopants from a variety of periodic table groups such as cobalt which is in group VIII.

In one embodiment, the CCTO is prepared as at least one of a nano and a micro particle. In another embodiment, the inventor proposes the addition of nano composites to CCTO, a core shell design, doping of the CCTO particles or the combination of any or all methods. A core shell design can include, for example, a CCTO core with an insulating shell such as AL2O3.

According to the current disclosure it is proposed to use either standard CCTO or a proprietary formula CTTO-X base material that may be doped applied using a variety of metallic materials including but not limited to zinc, aluminum, silver, boron and lanthanum.

An example of CCTO synthesis is based on the HHR Tube system described above.

The powders derived from the oxalate precursor have excellent sinterability resulting in high density ceramics which exhibited giant dielectric constants up to 160,000 1 kHz at 25° C. accompanied by low dielectric loss <0.07.

The CCTO particles are fabricated to a particle size of less than 200 nm. A shell may be applied to ensure the particles do not agglomerate and/or have a desired particle separation.

In one embodiment of the present disclosure, it is provided a multi-mode CCTO-X particle sizes using the optimum particle size range in the micro sized CCTO-X and/or nanoparticle sized CCTO-X for dense packing.

In one embodiment, it is provided a multi-mode LSNO-X particle sizes using the optimum particle size range in the micro sized LNSO-X and/or nanoparticle sized LNSO-X for dense packing.

Using the core shell particle (dielectric core and Al2O3 shell), offers a secondary charge effect from gamma radiation. Natural gamma background radiation can impact the dielectric core and or the Al2O3 shell and cause secondary electron emissions resulting in a charge within the dielectric particle. Al2O3 is a highly emissive material for electrons as a result of radiation impact.

Energy Storage Matrix

The energy storage layer, according an example embodiment, comprises micro and/or nanoparticles, simple particles, doped particles, core shell particles, composite particles, or a combination, and is mixed in a binder with a specified thickness. Preferred thickness after the draw (stretching) process is less than one micron for nanoparticles and less than 10 microns for micro particles. The binder material, according to the example, may be a rubber, epoxy, polymer, or ceramic.

The preferred binder material is cellulose acetate (Ca) offering a high operation temperature (150 degrees Celsius melt point) and high voltage breakdown.

A plasticizer can be combined with cellulose acetate to allow for easier stretching.

Various fabrication methods are available to create the DEUC layers. One method for fabricating the energy storage layer comprises spray particle deposition. Another method of fabrication of the energy storage media is based on extrusion.

The DEUC can be fabricated using several techniques. The inventor has evaluated the use of thin film spin coat devices and spray deposition.

The challenges arise when one considers the need to create extremely thin films for the energy storage layer and the electrodes. Fabrication of films at the nano level pose challenges for electrode interconnection, the need to interconnect numerous layers to scale up.

Spray deposition provides a method to create long films to enable a thin film roll-up to reach the desired battery size. One method for spray deposition of the electrode and energy storage media is the use of ultrasonic nozzles that operate by converting high frequency sound waves into mechanical vibrations, which atomize liquids into mathematically defined micron sized droplets. These droplets have a very tight drop distribution, and their size is dictated by the frequency at which the nozzle operates.

Continuous vibrations of the nozzle disperse particles evenly in suspension during the coating process, creating homogeneous thin film layers of functional particles. 120 kHz and higher frequency nozzles have proven most successful. These higher frequency nozzles produce the smallest droplet sizes with effective de-agglomeration of particles. This process is one method for a graphene coating processes to create the electrodes on the energy storage media. The graphene electrodes may be applied to the storage media preform prior to curing or to the cured storage media.

The use of cellulose acetate or cellulose acetate with a plasticizer for the core-shell dielectric particle (dielectric particle core and insulator shell) provides high voltage breakdown and low dielectric properties with good dispersion of the filler in the composites.

The multilayer preform and stretching of the preform to create the thin film solves the issue of scalability. The DEUC enables the fabrication of large area modules using a preform fabricated at a larger scale that is stretched into thin films of a smaller scale. The use of micro fabrication techniques to create and combine components at the nano scale is impractical. Spray deposition to create the nano level components requires extensive curing cycles for each layer and is a complex process. The DEUC design solves the issue of efficient and cost effective fabrication of an ultracapacitor that provides high energy density, rapid charge times and unlimited charge cycles.

The DEUC energy storage media is based on nanoparticles of a high dielectric material such as calcium copper titanate, $CaCu_3Ti_4Oi_2$ and La15/8Sr1/8NiO4 LSNO. Calcium copper titanate CCTO and LSNO have extremely large effective dielectric constants.

The particles may or may not have a protective coating before being suspended in a binder. If a protective coating is used, the particles could be fabricated as a core and shell design where the dielectric particle would be applied as the core and material compatible with the core and binder material is applied as the outer shell.

The particles are suspended in a high performance media that may be insulating or conducting called a "storage media". The storage media is positioned between the electrodes of the DEUC.

Standard CCTO or CCTO synthesized with a specific copper content and/or metallic doping can be suspended in a media with high electric breakdown characteristics to create a high density energy storage media. The storage medial can be fabricated as a thin film with high performance electrodes to create a high density ultracapacitor to be applied in a wide range of applications.

Pure CCTO bulk properties are optimized by reducing impurities and anomalies to improved performance in the Dense Energy Ultracapacitor. The inventor has created proprietary CCTO utilizing variations in copper content and/or doping with a metallic material called CCTO-X.

Alignment of the CCTO polarity within the polymer can accomplished at two different times during fabrication. The first alignment process for the dielectric particles can be accomplished during the curing phase when the energy layer polymer matrix is viscous. The second alignment process can be accomplished during the draw process when the Preform is heated to be stretched.

The use of cellulose acetate as a binder for the energy storage layer provides a voltage breakdown strength significantly higher than the typical PVDF capacitor binder. This allows for increased voltage and current applied to the energy density layer and the dielectric particles which increases the strength in electric field intensity at the dielectric particles resulting in increased energy storage density.

The dielectric charge can be increased by using a pulsed charge in addition to the set voltage and current applied to the electrodes that drive the electric field intensity across the energy storage layers. The base charge voltage and current, align the dielectric particles and store energy in the dielectric particles. The addition of a pulsing higher voltage or current increases energy storage in the dielectric particles thereby increasing the energy density of the DEUC cell and or device.

The base charge and voltage are within the voltage breakdown rating. The pulsed voltage and or current are momentarily above the base voltage and/or current, yet remain below the voltage breakdown of the materials involved.

The base charge and pulse charge combined allow for an increased charge capacity in the dielectric material without impact to the binder material.

Electrodes

In one embodiment of the disclosure, graphene and or carbon nanotubes (CNT) material is proposed for the electrodes. Graphene is an allotrope of carbon. In graphene, carbon atoms are arranged in a regular hexagonal pattern. Graphene can be described as a one-atom thick layer of the mineral graphite. Multiple layers of graphene stacked together effectively form crystalline flake graphite.

Graphene differs from most conventional three-dimensional materials. Intrinsic graphene is a semi metal or zero-gap semiconductor. Experimental results from transport measurements show that graphene has remarkably high electron mobility at room temperature, with reported values in excess of 15,000 $cm^{2'}$ Graphene can also be configured as a tube or elongated particle. A 2-D or 3-D array of the graphene elongated particles could interconnect with the storage media and allow flexing of the storage media across temperature changes and applied voltage.

The graphene could be connected to a metallic or conducting material for the electrode and allow for interconnection of the anodes and cathodes to form a stack of ultracapacitor cells.

The extremely high surface area to mass ratio of graphene makes it an excellent candidate to be combined with a polymer matrix to create a conductive plate such as electrodes for Dense Energy UltraCapacitor DEUC enabling greater energy storage density.

The electrodes need to be highly conductive and create an intricate bond with the energy storage media. The electrodes and energy storage media need to be compatible with thermal and/or electric voltage effects, or any other affects that would interfere with the electrode and storage media interconnection.

Electrodes may be composed of a one or more but not limited to conductive metals, conductive polymer, a conductive polymer particle matrix, copolymer and or terpolymer composites, polymer loaded with carbon nano tubes, graphene, and/or a combination of any of these materials. The electrodes may be designed in a multi-layer 2-D or 3-D configuration.

Cellulose acetate can be used as a base polymer to be combined with conducting polymers such as, but not limited to, polyaniline (PAni), polypyrrole (PPy), Poly(4-Vinylpyridine) and polythiophen (PTh). The stability and film-forming properties of cellulose acetate combined with a plasticizer.

The electrodes may be fabricated in a variety of methods, including but not limited to spray deposition, vapor deposition, extrusion, and print spray.

Alignment of the CNT within the polymer can accomplished at two different times during fabrication. The first alignment process can be accomplished during the curing phase of the electrodes when the polymer matrix is viscous. The second alignment process can be accomplished during the draw process when the Preform is heated to be stretched. Alignment of the CNT particles in the polymer matrix is accomplished using an alternating current electric field.

In one embodiment, a composite polymer electrode is comprised of a mixture of cellulose acetate and Poly(4-Vinylpyridine). The incorporation of the ion exchanging Poly(4-Vinylpyridine) into cellulose acetate provides a structure for the Poly(4-Vinylpyridine) and electrical conductivity for the polymer matrix, maintaining the general properties of cellulose acetate.

Similar to cellulose acetate, Poly(4-Vinylpyridine) has a melt point of 260 degrees Celsius and can be combined with a plasticizer to decrease the melt point. Conducting particles such as metals, active carbon, carbon nanotubes and graphene may be added to the mixture to increase conductivity.

In the DEUC design a metallic or other dense material could be applied at or within one or more electrode layers to cause an interaction with radiation including naturally occurring background radiation for the creation of an electric charge. For example, naturally occurring gamma radiation would impact the dense material and cause a large number of electrons to be dispersed into the electrode resulting in a charge. The large or small charge creates an electric field across the electrodes that surround the dielectric particle and increase the charge within the dielectric particle. This could be used as a natural trickle charge for the DEUC.

Radioactive material is found throughout nature. Detectable amounts occur naturally in soil, rocks, water, air, and vegetation, from which it is inhaled and ingested into the body. In addition to this internal exposure, humans also receive external exposure from radioactive materials that remain outside the body and from cosmic radiation from space. The worldwide average natural dose to humans is humans is about 3 millisievert (mSv) per year. The typical background radiation dose for most normal locations around the world is around 100 nGy per or hour 10 micro rem per hour.

Metal Based Electrode

Metal based electrodes offer straight forward conductivity but typically have a melt point and flow characteristics that are no compatible with a polymer based Preform for drawing (stretching) in a draw tower. With the introduction of cellulose acetate (Ca) as the polymer for the energy layer matrix, the melt point and flow points are raised. Cellulose Acetate has a melt point of 260 degrees Celsius as shown in FIG. 10. The Melt point of Cellulose Acetate is reduced slightly to around 230 degrees Celsius with the addition of a plasticizer used to soften the polymer material to improve stretching in the draw (stretching) process.

The inventor has found that the metal Tin (Sn), Tin alloys and or Tin compounds are soft metals with good conductivity and a low melt point. The melt point for Tin solder (Sn3) is 260 degrees Celsius—matching the melt point of cellulose acetate, as shown in FIG. 10. Other potential metal electrode materials are described in FIG. 10.

Preform Fabrication

A preferred method for the fabrication of the DEUC, according to one example, comprises the creation of a multi-layer "Preform" that emulates the cross section of one or more DEUC cells and the stretching of said Preform into a multi-layered thin film.

The individual electrode and energy storage layers are fabricated and then formed together in a multi-layer sheet.

The use of polymer binders allows the merging of the layers together under temperature to form a single multilayer sheet. The use of metals, metal alloys and or an electrical conducting polymer matrix allows for similar environmental characteristics of the electrode and energy storage layers, enabling a cohesive bond under temperature, electrical load and energy storage.

In one embodiment, an energy storage media uses Cellulose Acetate (Ca) polymer with CCTO particles and forming a film by various means including extruding the mixture into a thick film or sheet. The energy storage media is sandwiched between two conductive polymer layers each forming an electrode.

The effect of stretching conditions, such as stretching ratios, temperatures and rates of extension all have effects on the fraction of β-phase and the dielectric properties of the resulting thin film. The stretching process increases the dielectric constant of the polymer matrix and reduces the dielectric loss.

FIG. 8 shows an exploded view of a cross section of the DEUC Preform 801 where both metal and polymer layers are integrated. Energy layers are interleaved in between metal electrode layers providing a multilayer thin film 803.

The electrodes are offset, alternating left to right in the stack with an electrode collector interconnecting the electrodes on the left and another electrode collector interconnecting the electrodes on the right.

Energy layer insulators separate the right and left electrodes.

Polymer matrix electrodes may be applied on the top or bottom of the stack and as electrode collectors to encapsulate the Preform in polymer.

In FIG. 6 is shown a cross section view of a DEUC Preform 601 where both metal electrode layers 602 and polymer energy layers 603 layers are integrated. The electrodes are offset, alternating left to right in the stack with an electrode collector 604a interconnecting the electrodes on the left and another electrode collector 604b interconnecting the electrodes on the right.

Energy layer 606 insulators separate the right and left electrodes.

Polymer matrix electrodes 605 may be applied on the top or bottom of the stack to encapsulate the Preform in polymer.

According to various embodiments of the present disclosure, a three stage polymer matrix fabrication method is used to create a deep cell energy storage device called a dense energy ultra-capacitor (DEUC). An example fabrication process applies the three stage polymer matrix fabrication method to create a serpentine polymer matrix interleaved between electrodes. These fabrication methods may be applied to a variety of applications.

One example application is offered. The Dense Energy Ultra-Capacitor is an energy storage device that requires a multi-layer polymer configuration. A high dielectric material comprises dielectric nanoparticles suspended in a polymer binder and is positioned in between anode and cathode elements of a device. The device technology is herein generally, and without limitation, referred to as Dense Energy Ultra-Capacitor (DEUC) and also may be referred to as a DEUC module or as a DEUC device.

The DEUC fabrication methods include the formation of a multilayer Preform to be stretched, thereby reducing the individual layers within the Preform into a thin ribbon. As shown in FIG. 7, the Preform, is an energy storage layer comprised of dielectric particles suspended in a polymer matrix is interleaved in between electrodes.

The electrodes are offset to form a left and right set electrode array. The energy storage layer is folded back and forth in a serpentine fashion providing interleaving positions for the electrodes and insulates the two electrode arrays from each other.

The formation of a polymer matrix electrode where carbon nano tubes or other conductive materials on a nano scale are mixed with a polymer such as cellulose acetate (CA) to form a conductive material that can be stretched into a nano thin film.

The polymer is combined with a solvent such as N-Methylpyrrolidone (NMP) for dilution. A conductive nanoparticle such as carbon nano tubes are combined with the diluted polymer to form an electrode solution.

The electrode solution is poured as a thin film with water or de-ionized water applied to the electrode solution to cause a coagulation of the electrode solution. The coagulated thin film is placed in a vacuum oven to cure into a thin film and may be cut to required sizes for the electrode application.

The formation of an energy storage layer comprised of dielectric nanoparticles suspended in a polymer matrix. The polymer such as cellulose acetate (CA) is combined with a solvent such as N-Methylpyrrolidone (NMP) for dilution. The dielectric nanoparticles are combined with the diluted polymer to form an energy storage solution.

The energy storage solution is poured as a thin film with water or de-ionized water applied to the energy storage solution to cause a coagulation of the electrode solution forming a flexible and cohesive material that can be folded to allow the electrode layers to be interspaced and interleaved in between the serpentine energy storage flexible material.

The combined energy layer thin film and inserted electrode layers create a dense energy ultracapacitor preform that is placed in a vacuum oven for curing.

DEUC Preform Stretched to Create DEUC Thin Film

The inventor has developed a Preform design for the DEUC where individual layers are extruded or spray coated to form the electrodes and energy storage layers. According to one example of a preform design, the metal Tin (Sn) electrode layers sandwich the polymer energy storage layers (Cellulose Acetate with a CCTO filler). The electrodes are offset left to right positive to negative to create a DEUC polymer multilayer sheet, or preform.

The DEUC polymer preform can be stretched uniaxial or biaxial to reduce the thickness of the Preform creating a DEUC Thin film.

The DEUC Preform can be applied in a vertical or horizontal draw down process (or generally also referred to as a draw process). One example is a draw tower, where the larger version of the DEUC device is fabricated as a Preform and drawn down by the draw tower, for example, to form a DEUC multilayer thin film. Drawing down can be done in vertical, horizontal, and/or other directions according to various embodiments. The meaning of the terms "draw down" or "drawing down" or the like, should not be limited to drawing down in a vertical direction. For example, using a draw table the Preform can be drawn and stretched on the table such as along a generally horizontal direction.

The multilayer thin film comprises one or more DEUC structural features in at least one dimension (e.g., thickness) that are proportionally reduced in comparison to the same DEUC structural features in the Preform.

The Preform layers must have similar melt point and heated flow characteristics to achieve a homogeneous flow of all of the layers in the Preform during the draw (stretch) process. The drawing device, such as a draw tower, heats the Preform and draws (stretches) the unified Preform in a homogeneous flow to achieve the DEUC thin film.

The DEUC structural features, according to various embodiments, may be reduced in a plurality of dimensions while drawing and creating a substantially symmetrical multilayer thin film ribbon replica of the Preform. This is shown by example in FIGS. 3, 4, 5 and 6. FIG. 3 illustrates the DEUC Preform placed in a draw tower for drawing (stretching) of the preform into a thin ribbon. FIG. 4 shows how pulling rollers can be applied to draw (stretch) the Preform into a thin film ribbon. FIG. 5 illustrates how a DEUC Preform can be stretched into a wide multilayer film. FIG. 6 shows the Preform and Multilayer Thin Film created from drawing (stretching) the Preform.

Current plastic fiber optic draw towers create 1 mm fibers from Preforms that are 100 mm in diameter or greater. Given this ratio the inventor expects to obtain multilayer thin film reduction ratios of at least 2 to 1, and likely reduction ratios of 1,000 to 1 or greater. The draw tower designed to support the DEUC would draw thin DEUC sheets, thin DEUC ribbons, and/or thin DEUC fibers.

In the example of FIG. 9 the Preform layers result in a 26 mm high Preform. In FIG. 10, according to the example, it can be seen where the Preform has been drawn down to a 26 micron height with the Preform and the individual layers reduced in height by 1,000 times.

The DEUC Preform can be applied in a stretching device using a uniaxial stretch or a biaxial stretch process to make reduced DEUC preform layers by stretching the Preform into a thin film. This is shown by example in FIG. 5 where the DEUC preform 501 is stretched 502 into a thin ribbon 5. (See also the example shown in FIG. 3.)

The draw process applied to the DEUC preform 601 results in a DEUC ribbon 610 with increased length 614, reduced width 612 and reduced height 613. This draw process, for example, takes the original individual layer thicknesses 605 of the DEUC preform 601 and reduces the individual layer thicknesses 615 in the DEUC ribbon 610.

The draw process, uniaxial stretch process, and biaxial stretch process, may be combined in any order and applied to an original DEUC preform or ribbon to create a desired multilayer thin film with reduced individual layers and with reduced DEUC structural features along at least one dimension relative to the original DEUC preform or ribbon. The use of a Preform may be applied to other thin film devices including energy storage devices, capacitors, alternative energy systems, such as photovoltaic and thermovoltaic cells and systems.

A draw tower can be used to pull or draw down the preform into a reduced size. The draw down ratio can be up to and exceed a reduction of 1,000. This allows the fabrication of the preform in a larger scale that is easier to work with and then drawn down to reduce the thickness of each of the preform layers.

One example uses a multi-process draw and stretch routine that allows the first stage of the preform reduction to be drawn down into a thin ribbon by the draw tower or stretch extrusion device.

The second stage of reduction is performed by stretching the thin ribbon into a wide thin film to allow roll up into a DEUC cell as shown, for example, in FIG. 8.

Another example uses the single draw down process where the DEUC preform is drawn down into a thin film and rolled into a DEUC cell.

The drawn ribbon from the draw tower or extrusion pull device can be rolled to a specified diameter to form a cell. Multiple cells may be stacked and interconnected in series or in parallel to form a DEUC module.

In FIG. 8 examples of a DEUC thin film 801 is rolled into a cylinder to form the cell. In Each of the thin film cells have one or more energy storage layers and two or more electrodes. The electrodes 804 and 805, in this example, are shown offset and separated from each other In another embodiment, the Dense Energy UltraCapacitor DEUC device and/or the DEUC Preform can be produced using particle deposition methods. The process creates a multi-layer thin film device or preform for reduction.

In another embodiment, one or more layers of the DEUC device (e.g., a DEUC multilayer thin film and/or a DEUC module) are spaced apart to form a cooling tunnel where heat within the DEUC is transferred into the cooling tunnel and moves to and is released through a thermal coupler.

The cooling tunnel could be filled with air, fluid or dielectric fluid to perform the heat transfer. A heat sink can be applied to absorb heat directly from the DEUC module or from the cooling tunnel.

The cooling tunnel heat can be circulated through the DEUC body by convection or through the use of an active pump (not shown).

One example method of fabrication for the DEUC is to create a preform comprised of multiple energy storage layers interleaved between electrode layers. Both the energy storage layers and the electrode layers are based on polymers that may have nanoparticles suspended in the polymer. The preform energy storage layers are fabricated as thick layers of 500 microns or more.

The preform electrode layers are fabricated at $1:10^{th}$ of the energy storage layer or thinner. The stack of polymer based energy storage layers and electrode layers are formed into a preform by heating the stack to allow the polymer layers to attach to each other.

As shown in FIG. 7, according to the present example, the preform 701 is placed in a draw tower 705 to be drawn down 702, or reduced to a thin multilayer film (or thin ribbon) 703. Draw towers are used in fiber optics to take a fiber optic preform and draw very thin fibers from the preform. This same principle can be used in the DEUC preform 701 to create the thin multilayer film (or thin ribbon) 703.

The DEUC preform is drawn down to a multilayer thin film. The multilayer thin film is a reduced version of the larger preform. The multilayer polymer thin film has DEUC structural features in at least one dimension proportionally reduced in comparison to the same DEUC structural features in the preform. The multilayer thin film can be rolled-up to form a battery module. Multiple battery modules can form an energy storage array.

In another example embodiment, the DEUC preform can be reduced using a combination of draw tower and uniaxial/biaxial stretching. For example, the DEUC preform can be drawn down and reduced by the draw tower in the first stage and stretched to form thinner multilayer film that is widened by the stretching process.

The advantage of this combined process is the creation of a wide thin film (or thin ribbon) that can be rolled up to form a cylindrical energy storage device, resembling current rechargeable batteries. Alternatively, the multilayer thin film can be stacked or folded to form a variety of shapes.

The fabrication of the energy storage layers and electrodes layers for the DEUC or DEUC preform can be accomplished in a variety of ways. The electrodes and storage media layers, for example, may be fabricated using a particle spray system or 3-D printing system.

The fabrication of the DEUC and/or DEUC preform may be applied to a roll-to-roll production process. Roll-to-roll processing, also known as web processing, reel-to-reel processing or R2R, is the process of creating electronic devices on a roll of flexible material.

The methods of applying coatings, printing, or performing other processes start with a roll of a flexible material and are re-reeled after the process to create an output roll. Once the rolls of material have been coated, laminated or printed they are normally cut to their finished size.

The energy storage sheets are cut to fit the form and function of a specific application and the electrodes are applied. The DEUC cells may be configured into 1-D, 2-D and/or 3-D arrays.

The DEUC has the potential to propel the electric vehicle EV industry that has suffered from limited driving distances, long charge times, limited numbers of recharges.

The insulator and interleaved contacts may be applied after the stretching process. The application of a liquid or semi-liquid that cures to form the insulator, followed by an electrical conducting material that cures to interconnect the electrodes represents another option.

A passive cooling process where transferred heat from the DEUC module(s) heats a liquid. According to a convection liquid transfer process, the heated liquid rises to meet a heat dissipation device such as a thermocouple and the cooled liquid falls towards the bottom of the DEUC module device.

DEUC Thin Film Applied as an Energy Storage Device

The DEUC Thin Film can be applied as a single layer DEUC cell or a multi-layer DEUC cell. The DEUC Thin Film has electrodes on the sides. The DEUC Thin Films can be stacked to any height to form a DEUC cell. The left and right electrode arrays are interconnected by an electrode collector to complete the interconnection and form a DEUC cell.

A DEUC Module can be formed from one or multiple DEUC cells. The electrode collectors are connected to the positive and negative terminals of the DEUC Module.

DEUC Energy Storage Device Applications

The DEUC is an energy storage device that can be applied to a broad range of applications and scaled from a micro device to a large system array. Examples of DEUC applications are circuit electronics, mobile devices, electric vehicles, residential and commercial applications, uninterruptible power supplies, support of the electric grid, and the storing of electrical power generated from alternative energy sources such as wind and solar.

The inventor's modeling data has demonstrated DEUC recharge cycles of over 1,000,000 without degradation even with deep cycling and rapid charging the DEUC. The DEUC provides a rapid recharge cycle time and store an estimated 4× the energy of a lithium-ion battery. An array of DEUCs could be configured as electrical energy stations to charge vehicles.

The following represents some examples of the DEUC module applications:

The DEUC module can be designed and fabricated to store and provide electrical power to at least one of:
  micro devices and integrated circuits,
  electric vehicles,
  unmanned aerial, terrestrial or water vehicles,
  electronic cigarettes,
  one or more of: mobile computing devices, laptops, tablets, mobile phones, wireless communication devices, and mobile sensor systems,
  an electric power grid,
  solar, wind, and other alternative energy systems support, and
  one or more uninterruptible power supplies.

The DEUC Modules can be coupled with:
  one or more solar cells;
  one or more radioisotope power cells;
  a photovoltaic system;
  a thermalvoltaic system;
  a movement charge system; and
  a manual charge system; and being designed and constructed for providing electric charge to the DEUC module and electric energy storage by the DEUC module.

The above applications do not represent the limits of the DEUC Module, many additional applications can be envisioned.

In another example embodiment, a method for producing nanoparticles uses a hydrogen hydrothermal reactor tube system. In this method, a hydrogen hydrothermal reactor tube (HHR) provides a mixing point where multiple materials interact. To synthesize the nano particles, supercritical fluid, pressure and either or disassociated hydrogen and disassociated oxygen are applied through input ports. A chemical solution for the nanoparticles is input into the HHR tube, via an input port, along with the supercritical fluid and or disassociated hydrogen and disassociated oxygen. Nanoparticles are synthesized in the reaction between the chemical solution and the supercritical fluid and or disassociated hydrogen and disassociated oxygen.

In another embodiment, a method for producing coated nanoparticles uses a hydrogen hydrothermal reactor tube system. In this method, a hydrogen hydrothermal reactor tube (HHR) provides a mixing point where multiple materials interact. To coat the nano particles, supercritical fluid, pressure and either or disassociated hydrogen and disassociated oxygen are applied through input ports. A chemical solution for the coating and the nanoparticles, and the nanoparticles are input into the HHR tube, via an input port. Supercritical fluid and or disassociated hydrogen and disassociated oxygen are also applied in the HHR tube through in input port. Nanoparticles are coated as a result of the reaction between the coating chemical solution, the nanoparticles, the supercritical fluid and or disassociated hydrogen and disassociated oxygen. This resulting micro and or nano particle is a core shell particle.

The coating process can be controlled by the adjusting the amount of heat, pressure, and rate of flow of the chemical solution to create coated nanoparticles of a desired coating thickness. The coatings applied to the particles are in the nano to micro scale of thickness surrounding the particle. These particles are applied within a narrow range of thickness variation (less than 100 nm size difference between particles).

The process can be a continuous feed process where chemical solutions, supercritical fluids, disassociated oxygen and or hydrogen are continuously introduced to the HHT mixing point.

Reaction conditions at the HHT mixing point can have temperatures at between 300° C. to 1,000° C., and pressures of 20 MPa-400 MPa. Particle synthesis and or Particle coating can be accomplished in 3 seconds or less. These conditions can be monitored and controlled using temperature, flow and pressure sensors reporting data to a processor that uses the sensor inputs to control temperature, flow and pressure devices in the hydrogen hydrothermal reactor tube system.

The hydrogen hydrothermal reactor tube is equipped with ridges that form a rifling effect for one or more of the input flows that are mixed at the mixing point.

Example particles that can be formed in the HHR tube include dielectric particles and core shell particles such a core of calcium copper titanate oxide (CCTO) with an aluminum oxide (Al2O3 shell. These core shell particles can be suspended in a polymer matrix to form energy storage layers for battery and or ultracapacitor applications. These energy storage layers can be interleaved with electrode layers to form a dense energy ultracapacitor device that stores energy. The interleaved layers can also be applied as a Preform for stretching and layer thickness reduction.

The illustrations of examples described herein are intended to provide a general understanding of the structure of various embodiments, and they are not intended to serve as a complete description of all the elements and features of apparatus and device that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes structure that is adapted to, set up, arranged, commanded, altered, modified, built, composed, constructed, designed, or that has any combination of these characteristics to carry out a given function. The term "adapted to" describes structure that is capable of, able to accommodate, to make, or that is suitable to carry out a given function.

The Abstract is provided with the understanding that it is not intended be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The corresponding structures, materials, acts, and equivalents of all means or step plus function elements, if any, in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:
1. A hydrogen hydrothermal reactor tube for the synthesis of nanoparticles, comprising:
   a. A hydrogen hydrothermal reactor tube (HHR Tube) that has one or more output ports that converge at a mixing point;

b. Three or more input ports that converge at a mixing point that include three or more of the following;
1. Chemical solution input,
2. Disassociated hydrogen (atomic hydrogen),
3. Disassociated oxygen, and
4. Super Critical Fluid;
c. Wherein the input ports converging on the mixing point create high heat and pressure;
d. Where the chemical solution reacts with the heat and pressure to form nanoparticles; and
e. Where the nanoparticles and remaining solution exit the mixing point into a filtration system to separate the nanoparticles for collection.

2. The hydrogen hydrothermal reactor tube of claim 1, wherein the atomic hydrogen and or atomic oxygen is injected into the mixing point along with a super critical fluid to create additional chemical and heat reactions enabling rapid chemical reaction rates and high conversion rates of a chemical solution into nanoparticles.

3. The hydrogen hydrothermal reactor tube of claim 1, wherein the amount of heat, pressure and rate of flow of the chemical solution can be adjusted to create nanoparticles of a desired particle size with a narrow particle size distribution.

4. The hydrogen hydrothermal reactor tube of claim 1, wherein the system provides for continuous synthesis of nanoparticles using continuous feed of supercritical fluid and chemical solution.

5. The hydrogen hydrothermal reactor tube of claim 1, wherein continuous syntheses of nanoparticles with reaction conditions of temperatures from 300° C.-1,000° C. and pressures of 20 MPa-400 MPa, with nanoparticle synthesis occurring in 3 seconds or less.

6. The hydrogen hydrothermal reactor tube of claim 1, where the hydrogen/hydrothermal reactor is monitored using a microprocessor coupled to at least one sensor.

7. The hydrogen hydrothermal reactor tube of claim 1, where the inside of the hydrogen/hydrothermal reactor is equipped with ridges that form a rifling effect for one or more of the components that are mixed.

8. A method for producing nanoparticles and/or coated nanoparticles using a hydrogen hydrothermal reactor tube system, the system comprising:
a hydrogen hydrothermal reactor tube comprising a plurality of ports that converge at a mixing point, the hydrogen hydrothermal reactor tube comprising a plurality of the following:
a chemical solution input that provides nanoparticle coating solution input flow to the mixing point;
a chemical solution input that provides a nanoparticles input flow, of nanoparticles to be coated, to the mixing point;
a disassociated hydrogen (atomic hydrogen) input that provides a disassociated hydrogen (atomic hydrogen) input flow to the mixing point;
a disassociated oxygen input that provides a disassociated oxygen input flow to the mixing point;
a super critical fluid input that provides super critical fluid input flow to the mixing point; and
a nanoparticle and/or coated nanoparticle output that provides an output flow of nanoparticles and/or coated nanoparticles from the mixing point; and the method comprising:
at the mixing point, creating high heat and pressure with the one or more input flows;
forming nanoparticles and/or coated nanoparticles from the chemical solution reacting with the high heat and pressure; and
exiting an output flow of nanoparticles and/or coated nanoparticles, and remaining solution, from the mixing point through the nanoparticle and/or coated nanoparticle output into a filtration system that separates the nanoparticles and/or coated nanoparticles for collection.

9. The method of claim 8, wherein the nanoparticle coating solution for coating the nanoparticles is applied to nanoparticles in the hydrogen hydrothermal reactor tube thereby applying a coating to the nanoparticles and creating core shell nanoparticles.

10. The method of claim 8, wherein the atomic hydrogen and/or atomic oxygen is injected into the mixing point, along with a supercritical water, to create additional chemical and heat reactions enabling rapid reaction rates and high conversion rates of the chemical solution into coated nanoparticles.

11. The method of claim 8, further comprising adjusting the amount of heat, pressure, and rate of flow of the chemical solution to create coated nanoparticles of a desired coating thickness in the micron to nano thickness range with a thickness variation of the coating less than 100 nm.

12. The method of claim 8, wherein the one or more input flows continuously flow into the hydrogen hydrothermal reactor tube system, in a continuous feed of at least supercritical fluid and chemical solution to the mixing point, and providing a continuous synthesis and output flow of coated nanoparticles exiting from the mixing point.

13. The method of claim 8, wherein a continuous synthesis of nanoparticles at the mixing point comprises reaction conditions of temperatures at between 300° C. to 1,000° C., and pressures of 20 MPa-400 MPa, with nanoparticle coating occurring in 3 seconds or less.

14. The method of claim 8, further comprising:
monitoring the hydrogen hydrothermal reactor tube system using a microprocessor coupled to at least one sensor in the hydrogen hydrothermal reactor tube system.

15. The method of claim 8, wherein an inside of the hydrogen hydrothermal reactor tube is equipped with ridges that form a rifling effect for one or more of the input flows that are mixed at the mixing point.

16. The method of claim 8, wherein the forming comprises:
forming dielectric nanoparticles and/or coated nanoparticles comprising calcium copper titanate oxide (CCTO).

17. The method of claim 16, wherein formed dielectric nanoparticles and/or coated dielectric nanoparticles are suspended in a polymer matrix forming one or more energy storage layers.

18. The method of claim 8, wherein formed nanoparticles and/or coated nanoparticles are suspended in a polymer matrix forming at least one energy storage layer that is interleaved with electrode layers to form at least one of an energy storage device and a Preform.

19. The method of claim 8, wherein formed nanoparticles and/or coated nanoparticles are suspended in a polymer matrix forming at least one energy storage layer that is interleaved with electrode layers to form a Preform; and
the Preform being applied in a draw tower process comprising stretching and reducing the thickness of the layers within the Preform.

20. A suspended particle Dense Energy Ultracapacitor (DEUC) preform for fabricating a DEUC module that provides rapid charge and energy storage, comprising:

a multilayer DEUC preform in a complex circuit pattern (Preform) having a size, a shape, and an arrangement of a plurality of matched layers in the micron thickness range that are attached together to form a unified Preform, designed and constructed for drawing by a draw process that stretches the unified Preform to a ratio greater than 1:2 and simultaneously reduces the plurality of matched layers of the unified Preform into a multilayer thin film comprised of nano layers, of nano thickness or less, having DEUC structural features in at least one dimension proportionally reduced in comparison to the same DEUC structural features in the Preform; and where all of the layers of the DEUC Preform are matched layers having similar a characteristics, including flow characteristics when heated and drawn (stretched) to enable a homogenous draw (stretch) of the unified Preform;

where one or more of the plurality of matched layers of the Preform comprise negative and positive electrodes made from a metal or a polymer matrix with suspended conducting particles "conducting polymer" and that are spaced apart by suspended particle high dielectric energy storage media;

where one or more layers of the plurality of matched polymer layers of the Preform comprise suspended particle high dielectric energy storage media (Energy layer);

where the high dielectric energy storage media comprises high dielectric particles that are produced using the HHR Tube system and are nano sized particles which are surface modified, to provide an electrically insulating shell applied to, and surrounding, each of the particles (Core Shell, Particles), preventing interfacial contact between the particle and the polymer layer suspending the particle, the core shell Particles are suspended in a binder comprising at least one of a polymer, a copolymer, and a terpolymer;

where alternating electrode layers are offset forming the Preform;

where the alternating electrode layers of the Preform are insulated from each other to form a left side electrode array and right side electrode array;

where each electrode array is interconnected to form a single electrode interface; and where the Energy layer and electrode layer polymers are cured forming a cohesive and unified Preform.

21. The suspended particle DEUC preform of claim 20, wherein the dielectric particles comprise at least one of:

a unique version of calcium copper titanate oxide where common calcium copper titanate oxide ($CaCu_3Ti_4Oi2$) also referred to as CCTO is modified to form the unique CCTO-X ($Ca_xCu_xTi_xO_x$); with variations in the amounts of copper Ca, Cu and/or Ti content; and where CCTO-X is doped with one or more materials comprising at least one of zinc, silver, aluminum, strontium, boron and lanthanum; and where CCTO-X particles are surfaced modified to have an electrically insulating shell surrounding the CCTO-X particle.

22. A method of fabrication of a suspended particle Dense Energy Ultracapacitor DEUC module, comprising:

receiving a multilayer and unified DEUC preform (Preform) having a size, a shape, and an arrangement of a plurality of layers with similar melt points and flow characteristics when heated (matched), suitable for stretching by a draw process into a multilayer thin film, the Preform including DEUC structural features that are in at least one dimension proportionally larger in comparison to the same DEUC structural features in the multilayer unified thin film, and where one or more layers of the Preform comprise negative and positive electrodes made from one or more of the following: metal film, metal alloy film, metal film with a particle matrix, a conductive polymer and or a conductive polymer matrix, that are spaced apart by suspended particle high dielectric energy storage media and offset in a left/right orientation in a multilayer stack, and where one or more layers of the Preform comprise suspended particle high dielectric energy storage media, and where the high dielectric energy storage media comprises high dielectric particles that are nano sized particles suspended in a binder comprising at least one of a polymer, a copolymer, and a terpolymer, and where all of the Preform layers are bound together to form a unified Preform; and stretching by a draw process the multilayer unified Preform into a multilayer thin film including DEUC structural features in at least one dimension proportionally reduced in comparison to the same DEUC structural features in the Preform.

23. The method of claim 22, wherein at least a portion of the multilayer thin film comprises a thin film ribbon, and wherein at least one of:

at least a portion of the thin film ribbon is formed into a DEUC ultracapacitor;

multiple portions of the thin film ribbon are stacked together to form a DEUC ultracapacitor;

a portion of the thin film ribbon is wound into a cylinder forming a DEUC ultracapacitor having many layers; and a portion of the thin film ribbon is wound into a cylinder forming a DEUC ultracapacitor in which the cylinder is further formed into any one of a plurality of various shapes.

24. A suspended particle dense energy ultracapacitor (DEUC) module that provides rapid charge and energy storage, the DEUC module comprising:

a. a polymer sheet loaded with high dielectric particles formed through extrusion and/or spray deposition to form an energy storage media layer;

b. where conductive material is applied on both sides of the energy storage media layer to form positive and negative conducting electrode layers;

c. where the positive conducting electrode layers (positive electrodes) and the negative conducting electrode layers (negative electrodes) are offset relative one another to separate them in a left/right orientation in a multilayer stack; and d. a multilayer thin film a multilayer film comprising a plurality of matched layers having DEUC structural features forming a multilayer unified DEUC preform (Preform) having a size, a shape, and an arrangement of a plurality of matched layers, where the unified preform is stretched to reduce all of the layers in one process to form a multilayer thin film having DEUC structural features in at least one dimension proportionally reduced in comparison to the same DEUC structural features in the Preform, the multilayer thin film applied as at least one of:

a layered DEUC module; and rolled up DEUC film forming a cylindrical DEUC module; and
e. positive electrodes being interconnected to form a positive connector of the DEUC module; and
f. negative electrodes being interconnected to form a negative connector of the DEUC module; and
g. where the high dielectric particles comprise at least one of:
   a proprietary version of calcium copper titanate oxide where common calcium copper titanate oxide ($CaCu_3Ti_4Oi2$) also referred to as CCTO is modified to form the proprietary version of CCTO-X ($Ca_xCu_xTi_xO_x$);
   the proprietary version of calcium copper titanate oxide (CCTO-X) having variations in copper Ca, Cu and/or Ti content;
   the CCTO-X being doped with one or more materials comprising at least one of zinc, silver, aluminum, strontium boron and Lanthanum;
   the CCTO-X particles being surface modified to have an electrically insulating shell surrounding each CCTO-X particle; and
   the high dielectric particles comprising at least one of:
   LSNO La15/8Sr1/8NiO4 particles, which are applied in a uniform distribution suspended in a polymer binder to form a suspended particle high dielectric energy storage media that is positioned between the electrodes; and
   titanium phenyl phosphate particles which are applied in a uniform distribution suspended in a polymer binder to form a suspended particle high dielectric energy storage media that is positioned between the electrodes.

25. The DEUC module of claim 24, wherein the DEUC module is designed and fabricated to store and provide electrical power to at least one of:
   micro devices and integrated circuits;
   electric vehicles;
   unmanned aerial, terrestrial or water vehicles;
   electronic cigarettes;
   one or more of: mobile computing devices, laptops, tablets, mobile phones, wireless communication devices, and mobile sensor systems;
   an electric power grid;
   solar, wind, and other alternative energy systems support; and
   one or more uninterruptible power supplies.

26. The DEUC module of claim 24, where the DEUC module is coupled with at least one of:
   one or more solar cells;
   one or more radioisotope power cells;
   a photovoltaic system;
   a thermalvoltaic system;
   a movement charge system; and
   a manual charge system; and
being designed and constructed for providing electric charge to the DEUC module and electric energy storage by the DEUC module.

27. A Dense Energy Ultra-Capacitor (DEUC) device comprising: a plurality of dielectric core-shell particles each with a core having a high dielectric constant based on having a permittivity value at or above 60,000, a modified stoichiometric chemical composition and an insulating shell surrounding the particle to form a core/shell nanoparticle with a particle loading factor in a polymer matrix that is close to or at the percolation threshold for the polymer matrix; two or more matrix layers with suspended core/shell dielectric particles of energy storage layers each being less than 50 microns thick, where the insulating shell of the dielectric particle eliminates interfacial contact between the polymer matrix and the core of the dielectric particle in the polymer matrix, two or more electrical conducting layers that are electrode layers each less than 50 microns thick, at least one of the matrix layers that are energy storage layers being interleaved between at least two of the electrical conducting layers that are electrode layers.

28. The Dense Energy Ultra-Capacitor device of claim 27, where the percolation threshold is defined as a core shell particle fill factor of between 15% and 50% when compared to the volume of the polymer matrix.

29. The Dense Energy Ultra-Capacitor device of claim 27, wherein the dielectric particles are comprised at least one of:
   a proprietary version of calcium copper titanate oxide where calcium copper titanate oxide ($CaCu_3Ti_4O2$) commonly referred to as CCTO is modified to form the proprietary CCTO-X ($Ca_aCu_xTi_yO2$); where variations in the stoichiometric values (a, x and y) include amounts of Ca, Cu and/or Ti content and where (a) is greater than 1, and/or (x) is less than or greater than 3 and/or (y) is less than or greater than 4;
   where CCTO-X nanoparticles may be doped with one or more materials including at least one of Calcium Oxide, zinc, silver, aluminum, strontium, boron and lanthanum, and
   where the CCTO-X particles are coated with an electrically insulating shell surrounding the CCTO-X particle.

30. The Dense Energy Ultra-Capacitor (DEUC) device of claim 27, wherein the energy storage and electrode layers span the length/width of the device structure and are disposed side-by-side to form cells with an insulating structure between them, and are interleaved between electrode layers with a similar geometry forming DEUC cells.

31. The Dense Energy Ultra-Capacitor (DEUC) device of claim 27, wherein the electrode layer is a metal or a conducting polymer.

32. The Dense Energy Ultra-Capacitor (DEUC) device of claim 27, where the fill factor for the core-shell nano particles suspended in the polymer matrix is at or near the percolation threshold for the dielectric particle filler in the suspension polymer matrix.

* * * * *